(12) United States Patent
Riederer

(10) Patent No.: US 8,339,447 B2
(45) Date of Patent: *Dec. 25, 2012

(54) STEREOSCOPIC ELECTRONIC MICROSCOPE WORKSTATION

(75) Inventor: Thomas P. Riederer, Santa Barbara, CA (US)

(73) Assignee: Truevision Systems, Inc., Santa Barbara, CA (US)

( * ) Notice: Subject to any disclaimer, the term of this patent is extended or adjusted under 35 U.S.C. 154(b) by 1696 days.

This patent is subject to a terminal disclaimer.

(21) Appl. No.: 11/668,400

(22) Filed: Jan. 29, 2007

(65) Prior Publication Data

US 2007/0121202 A1    May 31, 2007

Related U.S. Application Data

(63) Continuation-in-part of application No. 11/256,497, filed on Oct. 21, 2005.

(60) Provisional application No. 60/762,577, filed on Jan. 27, 2006.

(51) Int. Cl.
*H04N 9/47* (2006.01)
(52) U.S. Cl. ............................... 348/79; 348/61; 348/42
(58) Field of Classification Search .................... 348/42, 348/51, 79, 80; 359/376, 464
See application file for complete search history.

(56) References Cited

U.S. PATENT DOCUMENTS

| | | | |
|---|---|---|---|
| 3,517,183 A | 6/1970 | Rebres |
| 3,725,113 A | 4/1973 | Chang |
| 3,867,697 A | 2/1975 | Vanzetti et al. |
| 4,127,481 A | 11/1978 | Malchesky et al. |
| 4,209,392 A | 6/1980 | Wallace |
| 4,231,871 A | 11/1980 | Lipps et al. |
| 4,267,047 A | 5/1981 | Henne et al. |
| 4,269,706 A | 5/1981 | Sondermann |
| 4,617,115 A | 10/1986 | Vantard |
| 4,691,997 A | 9/1987 | Muchel |
| 4,747,822 A | 5/1988 | Peabody |
| 4,769,037 A | 9/1988 | Midcalf |
| 4,786,155 A | 11/1988 | Fantone et al. |
| 4,967,268 A | 10/1990 | Lipton et al. |
| 4,988,569 A | 1/1991 | Okazaki et al. |

(Continued)

FOREIGN PATENT DOCUMENTS

DE        31 10128 A1    9/1982

(Continued)

OTHER PUBLICATIONS

DentiMag3D. Product Description [online]. StereoImaging Corporation [retrieved on Oct. 13, 2005]. retrieved from the Internet: <URL:http://www.stereoimaging.com/products/dentimag.html>.

(Continued)

*Primary Examiner* — Greg C Bengzon
(74) *Attorney, Agent, or Firm* — K&L Gates LLP; Louis C. Cullman; Robert T. Clarke

(57) ABSTRACT

A stereoscopic microscope workstation providing high-resolution, real-time data to a display device. Various embodiments are disclosed including desktop and free-standing workstations. An image processing unit can be implemented, providing for natural orientation of the magnified image of the viewed object, also allowing rotation, cropping, filtering and other image manipulation features. Methods of performing a procedure utilizing the stereoscopic microscope workstation are disclosed, including a method of manipulating an object while viewing the object in a high-resolution real-time magnified image.

19 Claims, 17 Drawing Sheets

U.S. PATENT DOCUMENTS

| | | | |
|---|---|---|---|
| 4,989,078 A | 1/1991 | Paxton | |
| 5,007,715 A | 4/1991 | Verhulst | |
| 5,015,388 A | 5/1991 | Pusineri et al. | |
| 5,022,744 A | 6/1991 | Leiter | |
| 5,045,936 A | 9/1991 | Lobb et al. | |
| 5,091,091 A | 2/1992 | Terman | |
| 5,108,612 A | 4/1992 | Flaig et al. | |
| 5,193,000 A | 3/1993 | Lipton et al. | |
| 5,200,838 A | 4/1993 | Nudelman et al. | |
| 5,240,601 A | 8/1993 | Mazid | |
| 5,513,005 A | 4/1996 | Muller et al. | |
| 5,545,120 A | 8/1996 | Chen et al. | |
| 5,568,183 A | 10/1996 | Cortjens et al. | |
| 5,568,188 A | 10/1996 | Widmer et al. | |
| 5,571,418 A | 11/1996 | Lee et al. | |
| 5,652,676 A | 7/1997 | Grinblat | |
| 5,679,260 A | 10/1997 | Boos et al. | |
| 5,793,523 A | 8/1998 | Twisselmann | |
| 5,825,532 A * | 10/1998 | Mochizuki et al. | 359/368 |
| 5,835,133 A | 11/1998 | Moreton et al. | |
| 5,867,210 A | 2/1999 | Rod | |
| 5,867,309 A | 2/1999 | Spink et al. | |
| 5,870,137 A | 2/1999 | Stuettler | |
| 5,912,763 A | 6/1999 | Spink | |
| 5,933,513 A | 8/1999 | Yoneyama et al. | |
| 6,069,733 A | 5/2000 | Spink et al. | |
| 6,084,979 A * | 7/2000 | Kanade et al. | 382/154 |
| 6,133,762 A | 10/2000 | Hill et al. | |
| 6,133,945 A | 10/2000 | Stuettler | |
| 6,144,762 A | 11/2000 | Brooks | |
| 6,147,797 A | 11/2000 | Lee | |
| 6,191,809 B1 * | 2/2001 | Hori et al. | 348/45 |
| 6,287,516 B1 | 9/2001 | Matson et al. | |
| 6,288,838 B1 | 9/2001 | Ito | |
| 6,337,765 B1 | 1/2002 | Spink et al. | |
| 6,441,958 B1 | 8/2002 | Yeung et al. | |
| 6,456,433 B1 | 9/2002 | Jones | |
| 6,503,195 B1 * | 1/2003 | Keller et al. | 600/160 |
| RE38,307 E | 11/2003 | Gustafsson et al. | |
| 6,643,070 B2 | 11/2003 | Deverin et al. | |
| 6,730,266 B2 | 5/2004 | Matson et al. | |
| 6,736,972 B1 | 5/2004 | Matson | |
| 6,765,718 B1 | 7/2004 | Spink et al. | |
| 6,787,040 B2 | 9/2004 | Radunsky et al. | |
| 6,992,718 B1 | 1/2006 | Takahara | |
| 7,199,923 B2 | 4/2007 | Sander | |
| 7,693,221 B2 * | 4/2010 | Routhier et al. | 375/240.26 |
| 7,963,913 B2 | 6/2011 | Devengenzo et al. | |
| 2001/0012067 A1 | 8/2001 | Spitzer et al. | |
| 2002/0054429 A1 * | 5/2002 | Engelhardt et al. | 359/368 |
| 2002/0057493 A1 | 5/2002 | Spink et al. | |
| 2002/0080478 A1 | 6/2002 | Mannss | |
| 2002/0191281 A1 | 12/2002 | Osa et al. | |
| 2003/0021016 A1 | 1/2003 | Grier | |
| 2003/0071893 A1 | 4/2003 | Miller et al. | |
| 2003/0184855 A1 | 10/2003 | Yasuda et al. | |
| 2003/0185450 A1 | 10/2003 | Garakani et al. | |
| 2004/0017607 A1 | 1/2004 | Hauger et al. | |
| 2004/0061932 A1 | 4/2004 | Pensel et al. | |
| 2004/0070667 A1 | 4/2004 | Ando | |
| 2004/0173530 A1 | 9/2004 | Radunsky et al. | |
| 2004/0223213 A1 | 11/2004 | Fukuyama et al. | |
| 2004/0227828 A1 | 11/2004 | Loose | |
| 2004/0228829 A1 | 11/2004 | Roberts et al. | |
| 2004/0264765 A1 | 12/2004 | Ohba | |
| 2005/0007659 A1 | 1/2005 | Steinthal et al. | |
| 2005/0014996 A1 | 1/2005 | Konomura et al. | |
| 2005/0024720 A1 | 2/2005 | Cartlidge et al. | |
| 2005/0046930 A1 | 3/2005 | Olschewski | |
| 2005/0063047 A1 | 3/2005 | Obrebski et al. | |
| 2005/0111088 A1 | 5/2005 | Winterot et al. | |
| 2005/0128573 A1 | 6/2005 | Merz | |
| 2005/0237384 A1 | 10/2005 | Jess et al. | |
| 2007/0121202 A1 | 5/2007 | Riederer | |
| 2007/0121203 A1 | 5/2007 | Riederer | |

FOREIGN PATENT DOCUMENTS

| | | |
|---|---|---|
| DE | 4243452 | 6/1994 |
| EP | 0 787 500 A1 | 8/1997 |
| JP | 405153475 A | 6/1993 |
| JP | 2005351916 A * | 12/2005 |
| WO | 00/02603 A2 | 7/1999 |
| WO | 03/009885 A2 | 2/2003 |

OTHER PUBLICATIONS

Leica IC 3D. product Description [online]. Leica Microsystems [retrived on Oct. 13, 2005]. Retrieved from the Internet: <URL: http://www.oleica-microsystems.com/website/lms.nsf?opendatabase&path=/website/products.nsf/(ALLIDs)/ECFFFC6CF17470FEC125706D002FBF06>.

The World's Only: Interactive Leica 3D System for Microscopy. Press Release [online]. Leica Microsystems, Jun. 24, 2005, pp. 1-2 [retrieved on Oct. 13, 2005]. Retrieved from the Internet: <URL:http://www.leica-nnicrosystems.com/website/lms.nsf?opendatabase&path=/website/products.nsf/(ALLIDs)/ECFFFcCF17470FEC125706D002FBF06> (See Press Releases).

Leica ICD: compact, Integrated Digital Camera for stereomiroscopes. Brochure [online]. Leica Microsystems, 2005, pp. 1-4 [retrieved on Apr. 20, 2006]. Retrieved from the Internet:<URL:http://www.leica-microsystems.com/website/lms.nsf?opendatabase&path=/WebSite/Download.nsf/(ALLIDs)/1C611440E77FF0EFC125700B003E478C>.

Anand, A.C., "Early Indicators of Prognosis in Fulminant Hepatic Failure: An Assessment of the King's Criteria", J. Hepatology, 1997, vol. 26, pp. 62-66.

Ash, S.R., "Treatment of Acute Hepatic Failure with Encepthalopahy: A Review", Int., J. Artif. Organs, 1991, vol. 14, pp. 191-195.

Awad, S.S., et al., "A Novel Stable Reproducible Model of Hepatic Failure in Canines", Journal of surgical Research, 2000, vol. 94, pp. 167-171.

Bende, S. et al., "Elimination of Endotoxin from the Blood by Extracorporeal Activated Charcoal Hemoperfusion in Experimental Canine Endotoxin Shock", Circulatory Shock, 1986, vol. 19, pp. 239-244.

Ellis, A.J., et al., "Temporary Extracorporeal Liver Support for Severe Acute Alcoholic Hepatitis Using the BioLogic-DT", Int. J. Artif. Organs, 1999, vol. 22, pp. 27-34.

Falkenhagen, D. et al., "Fractionated Plasma Separation and Adsorption System: A Novel System for Blood Purification to Remove Albumin Bound Substances", Artif. Organs, 1999, vol. 23, pp. 81-86.

Hughes, R. et al., "Use of Sorbent Columns and Haemofiltration in Fulminant Hepatic Failure", Bolld, Purif., 1993, vol. 11, pp. 163-169.

Hughes, R.D., et al., "Artificial Liver Support in Acute Liver Failure: A Review of Studies at King's", Artif. Organs, 1992, vol. 16, pp. 167-170.

Hughes, R.D., at al., "In-Vitro Blood Compatibility Studies on a New Polymer-Coated Charcoal for Haemoperfusion", The International Journal of Artificial Organs, 1980, vol. 3, No. 5, pp. 277-279.

Hughes, R.D., at al., "Platelet Function during Haemoperfusion in Acute Liver Failure", The International Journal of Artificial Organs, 1980, vol. 3, No. 1, pp. 30-34.

Kellum, J. A., et al., "Effect of Hemofiltration Filter Adsorption on circulating IL-6 Levels in Septic Rats", Critical Care, 2002, vol. 6, pp. 429-433.

Makin, A.J., et al., "Systemic and Hepatic Hemodynamic Changes in Acute Liver Injury", The American Physiological Societey, 1997, vol. 272, pp. G617-G625.

Morimoto, T., et al., "Plasma Adsorption Using Bilirubin-Adsorbent Materials as a Treatment for Patients with Hepatic Failure", Artificial Organs, 1989, pp. 447-452.

Mullen, K., et al., "Hepatic Encephalopahy", Schiff's Diseases of the Liver, Eighth-Edition, Lippincot-Raven Publishers, Philadelphia, 1999, pp. 545-581.

Nagaki, M., at al., "In Vitro Plasma Perfusion Through Adsorbents and Plasma Ultrafiltration to Remove Endotaxin and Cytokines", Circulatory Shock, 1992, vol. 38, pp. 182-188.

Nagaki, M., et al., "Removal of Endotoxin and Cytokines by Adsorbents and the Effect of Plasma Protein Binding", Liver Unit, King's College School of Medicine and Dentistry, 1991, vol. 4 pp. 43-50.

Nakae, H., et al., "Effectiveness of Combining Plasma Exchange and Continuous Hemodiafiltration (Combined Modality Therapy in a Parallel Circuit) in the Treatment of Patients wit Acute Hepatic Failure", Therapeutic Apheresis, 2001, vol. 5, No. 6, pp. 471-475.

Odnopozov, V. A., "Effect of Hemocarboperfusion on Organ Blood Flow and Survival in Porcine Endotoxic Shock", Critical Care Med., 1996, vol. 24, No. 12, pp. 2020-2026.

Peltekian, K. et al., "Role of Cytokines and Immune Mechanisms in Acute Liver Failure", Edited by Lee WM et al,, (eds), Cambridge Press, 1997, pp. 67-78.

Rahman, T.M., et al., "Review Article: Liver Support Systems in Acute Hepatic Failure", Aliment Pharmacol Ther, 1999, vol. 13, pp. 1255-1272.

Ronco, C., et al., "A Pilot Study of Coupled Plasma Filtration with Adsorption in Septic Shock", Critical Care Med. 2002, vol. 30, No. 6, pp. 1250-1255.

Ryan, C.J., et al., "Preclinical Evaluation of Haemoorbents", The International Journal of Artificial Organs, 1986, vol. 9, No. 5, pp. 293-296.

Ryan, C.J., et al., "Repeated Membrane Plasma Separation wit On-Line Sorbent Treatment of Plasma in the Conscious Rat", Artificial Organs, 1986, vol. 10, No. 2, pp. 135-144.

Schiodt, F.V., et al., "Etiology and Outcome for 295 Patients with Acute Liver Failure in the United States", Liver Transplantation and Surgery, vol. 5, No. 1 , Jan. 1999, pp. 29-34.

Schodt, F.V., et al., "Acetaminophen Toxicity in an Urban County Hospital", The New England Journal of Medicine, Oct. 16, 1997, vol. 337, No. 16, pp. 1112-1117.

Strange, J. et al, "Liver Support by Extracorporeal Blood Purification—A Clinical Observation", German Ministry for Research and Technology, Germany, 2000, vol. 6, No. 5, pp, 603-613.

Sudan, D.L., et al., "Long-Term Follow-up of Auxiliary Orthotopic Liver Transplantation for the Treatment of Fulminant Hepatic Failure", Surgery, 1997, vol. 122, No. 4, pp. 777-778.

Sussman, N.L., et al., "Reversal of Fulminant Hepatic Failure Using an Extracorporeal Liver Assist Device", Hepatology, 1992, vol. 16, No. 1, pp. 60-65.

Terblanche, J. et al., "Animal Models of Fulminant Hepatic Failure", Digestive Diseases and Sciences, 1991, vol. 26, No. 6, pp. 770-774.

Tetta, C., et al., "Endotoxin and Cytokine Removal in Sepsis", Ther. Apher., 2002, vol. 6, No. 2, pp. 109-115.

Wendon, J.A., et al., "Cerebral Blood Flow and Metabolism in Fulminant Liver Failure", Hepatology, 1994, vol. 19, pp. 1407-1413.

Wehler, M. et al., "Short-Term Prognosis in Critically Ill Patients with Cirrhosis Assessed by Prognostic Scoring Sytems", Hepatology, 2001, vol. 34, pp. 255-261.

Williams, R., "New Directions in Acute Liver Failure", Journal of the Regal College of Physicians of London, 1994, vol. 28, No. 6, pp. 552-559.

Venkataraman, R., et al., "Clinical Review: Extracorporeal Blood Purification in Severe Sepsis", Critical Care, 2003, vol. 7, No. 2, pp. 139-145.

Angus, D.C., et al., "Epidemiology of Severe Sepsis in the United States; Analysis of Incidence, Outcome, and Associated Costs of Care", Critical Care Med., 2001, vol. 29, No. 7, pp. 1303-1310.

Atti, M., et al., "Contact-Phase Activation During Hemodiafiltration Using the HFR Technique can be Confirmed with Some Types of Activated Carbon", Italian Journal of Nephrology, 2004, vol. 21, Suppl. 20, pp. S61-S66.

Martin, G.S., et al., "The Epidemiology of Sepsis in the United States from 1979 through 2000", The New England Journal of Medicine, 2003, vol. 348m oo, 1546-1554.

www.leica-microsystems.com/products, "Download Leica IC A" (lists downloadable brochures and user manuals).

"Leica ICA Integrated video module" (brochure, English), dated Jan. 24, 2002.

"Leica IC A User Manual" (English), dated May 11, 2004.

* cited by examiner

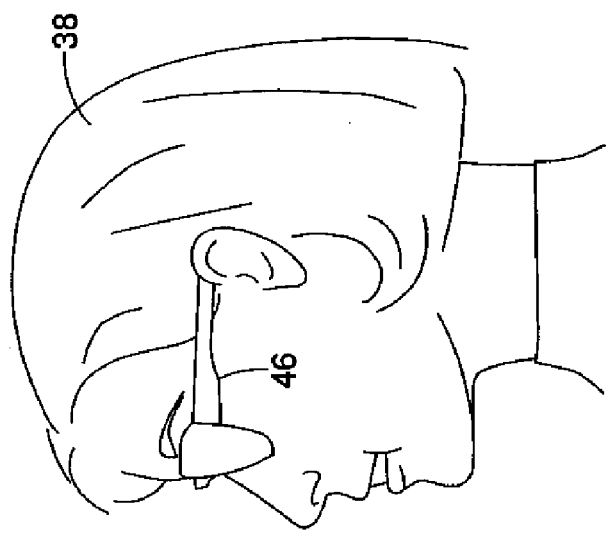
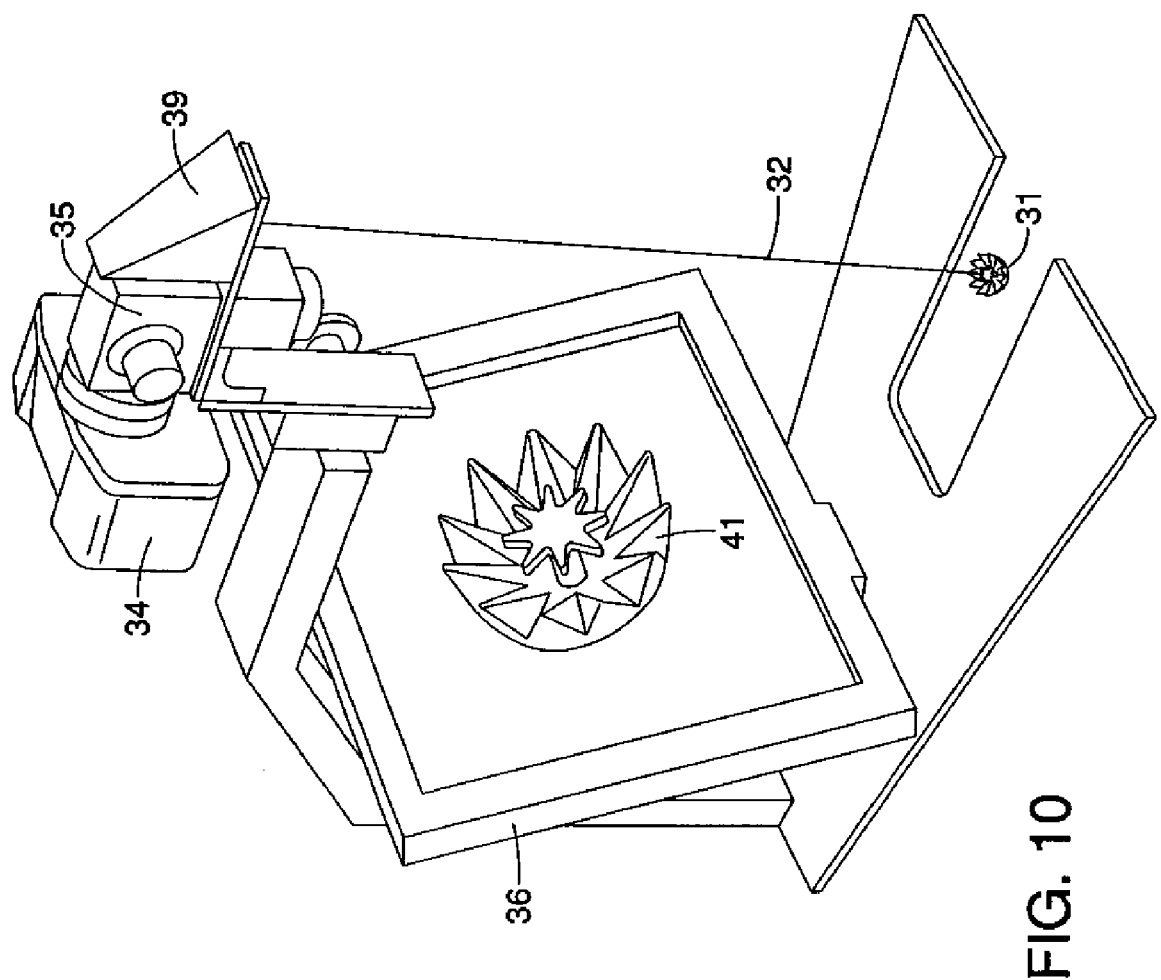
FIG. 10

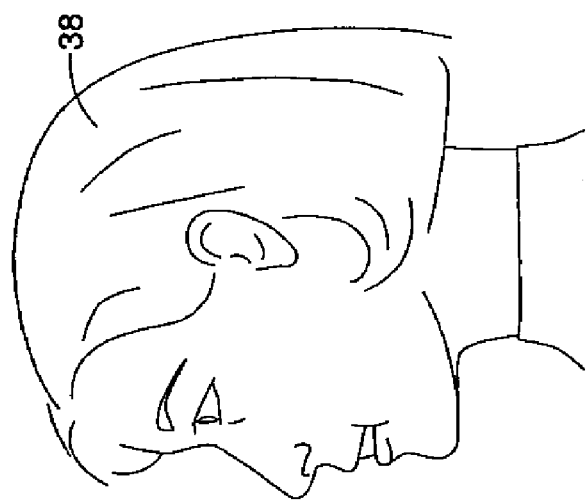
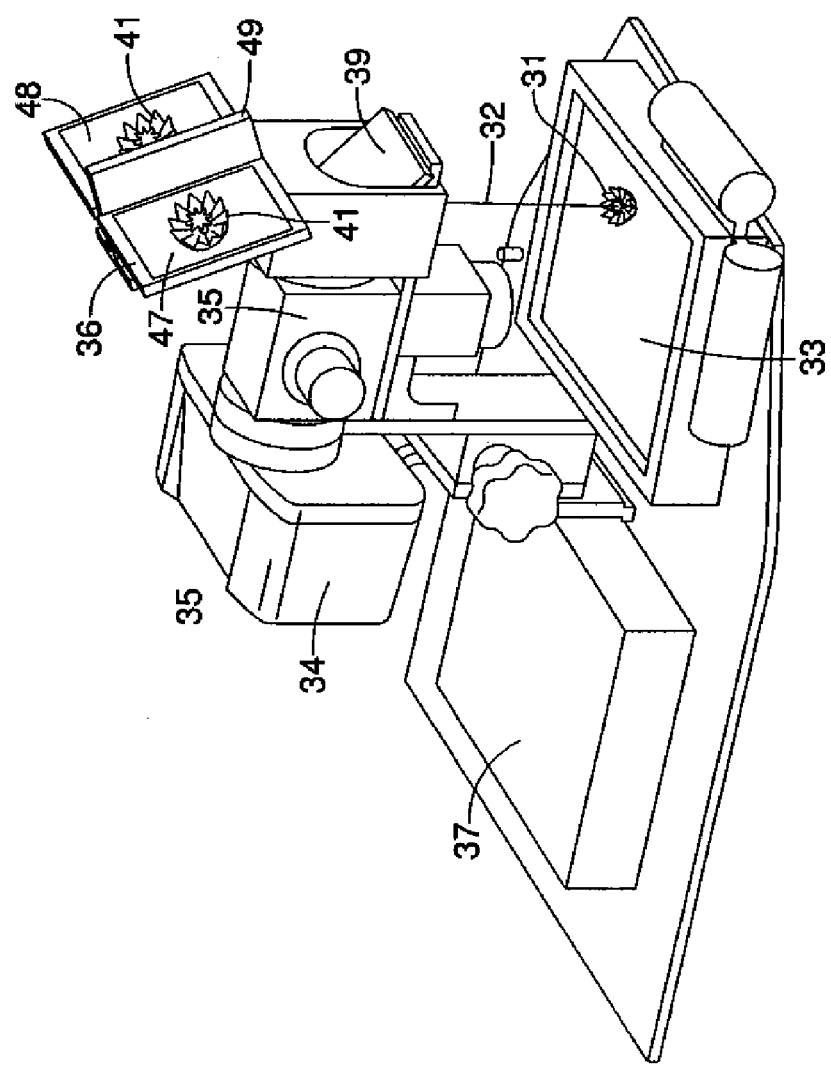
FIG. 12 ively used in scientific research, education, surgery, medical and dental examinations, and industrial inspection and manufacturing where depth perception or a depth of field of the view is desirable.

STEREOSCOPIC ELECTRONIC MICROSCOPE WORKSTATION

CROSS REFERENCE TO RELATED APPLICATIONS

This application is a continuation-in-part application and claims priority to the earlier non-provisional application entitled "Stereoscopic Image Acquisition Device" filed Oct. 21, 2005 and having Ser. No. 11/256,497, the disclosures of which are hereby incorporated herein by reference in their entirety. This application also claims priority to the earlier provisional application entitled "Stereoscopic Electronic Microscope Workstation" filed Jan. 27, 2006 and having Ser. No. 60/762,577, the disclosures of which are hereby incorporated herein by reference in their entirety.

TECHNICAL FIELD

This invention generally relates to methods and apparatus for stereoscopic imaging and, more specifically, to a stereoscopic microscope workstation.

BACKGROUND

The use of microscopes in the performance of tasks relating to magnifying small objects is common in many areas of science, medicine and manufacturing. Stereomicroscopes, in which the user sees left-eye and right-eye views and forms a three-dimensional or stereoscopic view, are also very common. That is, a stereoscopic view provides the normal stereoscopic sense of depth ("stereopsis") enjoyed by the natural eyesight of a human user having two eyes, (e.g. normal eyesight). Stereomicroscopes are typically used in scientific research, education, surgery, medical and dental examinations, and industrial inspection and manufacturing where depth perception or a depth of field of the view is desirable.

Typically a user sits in an upright position with hands in front at about waist height for object manipulation. Eyepieces are generally located such that the user peers down at an angle into them to see the magnified image of the object. Such a position is generally accepted as ergonomic, intended to maximize productivity by reducing user fatigue and discomfort. In fact in some jobs the worker is in this position for hours each workday. However the use of eyepieces in optical systems is often problematic, particularly in microscopy. Eyepieces require the user to maintain a fixed position while observing the object or desired field of view, such that frequent or prolonged use can lead to eye, neck, and/or back strain. In addition, visualization can be difficult due to misalignment between eyes and eyepieces, or between eyeglasses and eyepieces, and a significant amount of time is needed to adjust, focus, and clean the eyepieces.

Furthermore, only one user or observer at a time can view images generated by the microscope and the user can no longer see what is happening in the surrounding environment. In addition, microscopes, as such, cannot store images or sequences of images for later reference, process them in special ways, or transmit them to remote viewing sites. Therefore, it is often desirable to use electronic imaging to replace the eyepiece optics of a microscope.

As noted above, eyepieces require the user to maintain a fixed position while observing the object or desired field of view, such that frequent or prolonged use can lead to eye, neck, and/or back strain. In addition, visualization can be difficult due to misalignment between eyes and eyepieces, or between eyeglasses and eyepieces, and a significant amount of time is needed to adjust, focus, and clean the eyepieces. Frequently, the user using the eyepieces can no longer see what is happening in a surrounding environment.

As is well known in the art, the use of two electronic cameras mounted on a stereomicroscope, each with a slightly different point-of-view provided by the microscope's optics can replicate the natural stereoscopic view perceived by human eyes through the microscope. In particular, when the images from the two cameras are displayed on a suitable display device, a stereoscopic, or three-dimensional, or "3D", image is generated.

In the current art, two independent cameras are typically attached to the stereomicroscope. The optical path to each camera is made by a beam-splitting element that sends some portion of light from each of the two optical paths of the microscope, in the portion of the path between the objective lens or lenses and eyepiece lenses, through the appropriate camera's lens system, to the camera's focal plane while the rest of the light continues on to the eyepieces. These cameras can be still-image capture cameras or moving-image capture cameras.

In the case of video cameras, signals from the two cameras are transmitted through two or more cables to camera control units (CCU), computers, recorders, or display devices. The image sensors within the cameras are usually of a technology known in the art as charge-coupled device (CCD). A filter to reduce the amount of infrared light reaching the sensor is usually integrated into the sensor assembly and is not removable.

In the current art, the moving-image cameras are typically standard definition (SD) video cameras, that is, cameras that conform to the NTSC or PAL video standards. Unfortunately, the resolution of such standard definition video cameras has generally not been adequate to replace the eyepieces entirely. The NTSC and PAL systems suffer from low resolution, poor color fidelity, and motion artifacts (due to the interlaced nature of the raster scan). Imagery from these cameras is not suitable for those applications, such as surgery, precision assembly, and scientific research, which require the highest quality visualization.

Because such systems still generally have the eyepieces, or provisions for them, the electronic display cannot be located at the optimally ergonomic position, (e.g. where the eyepieces are located). So the display is generally located off to one side or above the eyepiece line-of-sight. This has the effect that using the electronic display alone solves some of the eyepiece problems but creates new problems.

The two camera systems described above have further disadvantages. Obtaining and maintaining stereoscopic alignment (necessary for comfortable, long-term viewing) can be difficult when two independent cameras are mounted on a microscope, each with their own adapters. The cameras generally protrude from the general body of the microscope and are often mounted in a way that is fragile and prone to breakage. Protruding cameras can interfere with existing microscope knobs and controls and other apparatuses in the workspace, limiting possible installation configurations, and their size or position can block the user's view. Dual camera systems generally require numerous mounting parts, resulting in less reliability and more cost than a single, integrated camera module.

In addition, there are also problems with mounting and connecting the cameras to displays or storage media. The use of two cameras requires multiple cables and connectors, resulting in less reliability and more difficult installation than a single cable/connector arrangement of the present invention. The two camera system also typically requires two CCUs and two storage devices and requires that they be synchronized for best image quality. Such synchronization significantly increases the complexity of the design, capital cost and maintenance of the system.

Such cameras do not allow precise positioning of the imaging sensors to each other for best stereopsis and comfortable viewing, particularly when two off-the-shelf cameras are used. The cameras must be individually focused after mounting, and, should adjustments such as brightness and contrast be needed, each camera must be controlled individually. Where the cameras contain irises, they must also be individually adjusted for each camera, resulting in the potential for unequal amounts of light entering each camera, which can lead to difficult 3D viewing and eyestrain. All these factors demonstrate that the installation and maintenance of such a system can be time-consuming and require a skilled technician.

Image processing is also problematic in such present art systems. As noted above, the cameras must be electronically linked in some way so that the two image streams are synchronized, creating additional cost, vulnerability and complexity. The images that result from the two cameras are generally taken directly to the stereoscopic display device. Should the user require image processing, storage, transmission, or display on alternative displays, additional processing units are required for each data stream, creating yet more additional cost, vulnerability and complexity.

Information relevant to attempts to address these problems can be found in U.S. Pat. No. 5,867,210 and U.S. Patent Application No. 2005/0111088, and at http://www.stereoimaging.com/products/dentimag.html, and http://www.leica-microsystems.com/eebsite/products.nsf/allids/ECFFFC6CF17470FEC1257C6D002FBF 06 (See Digital Photo/Leica IC 3D). However, each one of these attempted solutions suffer from one or more of the following disadvantages: (i) the device creates two independent output signals, (ii) the device is not lightweight or compact, (iii) the device does not provide sufficient image processing, recording, or transmission capability, (iv) the device does not have adequate resolution in real-time for many applications, (v) the device was designed to be used with eyepieces, or (vi) the device is limited with respect to the make or type of optical instruments with it which can be used.

SUMMARY

The present invention relates to a compact stereoscopic image acquisition apparatus and methods capable of acquiring and displaying high-quality stereoscopic images. The invention further can be embodied in compact and reliable workstations providing ergonomic posture for the use of such stereoscopic devices. More particularly, the disclosed apparatus and method acquire and transfer high-resolution, real-time images to image processing, recording, or display systems. The disclosed apparatus and method can perform these desired functions without protruding elements, numerous cables and connectors, and other additional components such as eyepieces found in the present art. As desired, in other alternate embodiments, the apparatus and methods can be readily adapted for use with a variety of existing optical instruments as well.

Contrary to the tunnel-like circular view (e.g. similar to looking through a tube) typically experienced when using a contemporary stereomicroscope outfitted with eyepieces, the present invention enhances a targeted visual field and presents this visual field in a natural, three-dimensional view with an ergonomic posture. Further, the magnified image is presented without destroying the user's peripheral view. This desirable feature allows the user to comfortably focus on the magnified image without losing peripheral vision. Preserving the user's peripheral vision allows the user to scan the surrounding working environment without changing focus or foveal view, resulting in a more effective and comfortable use of the device as well as a safer and more convenient surrounding working environment.

More particularly, a variety of specific aspects of the invention are disclosed. In one aspect, a stereoscopic microscope workstation for a user to view an object as a magnified image is described. The stereoscopic workstation primarily comprises of: (i) a stereomicroscope capable of acquiring a plurality of optical views of the object and providing a plurality of optical paths of the plurality of optical views thereof, (ii) a stereoscopic image acquisition device acquiring the plurality of optical paths from the stereoscopic microscope and transmitting a real-time image data stream representing the plurality of optical paths, and (iii) a display means receiving the real-time image data stream and displaying a stereoscopic magnified image of the object to the user. The stereoscopic microscope workstation is capable of presenting the stereoscopic magnified image of the object in high-resolution, (at least 1280×720 pixels) for at least two of the optical views of the plurality of optical views. Where desired, the stereoscopic microscope workstation can display the magnified image of the object in the same orientation as the object.

In another aspect, an image processing unit for manipulating the real-time image data stream prior to the display means receiving the real-time image data stream can be implemented. Such an image processing unit for manipulating the real-time image data stream provides the user the ability to rotate, crop, invert, mirror and filter the real-time image data stream, among other useful features.

In yet another aspect, the stereoscopic microscope workstation comprises a single flat LCD display. Where a single flat LCD display is utilized to present a stereoscopic view of the magnified image of the object, differently-polarized spectacles are configured over the user's eyes to enable a stereoscopic view of the magnified image of the object. Such spectacles can also have only a portion of the optical lens polarized, such that the remainder of the user's visual field is not optically modified by the spectacles, thereby allowing for the performance of tasks with natural vision outside or away from the magnified image of the object. Other embodiments are described wherein the display means comprises separate left and right views.

In still yet another aspect, the stereoscopic microscope workstation is configured in a free-standing configuration.

In another aspect, embodiments of the stereoscopic microscope workstation further comprise a deflective element between the object and an objective lens of the stereomicroscope, or further comprise a deflective element to change a central optical axis of the plurality of optical paths. In preferred embodiments, such a deflective element that can be rotated about one or more axes to provide a change in the location of the viewing point of the object in the magnified image.

In certain applications it is preferable to configure a holding means capable of holding the object, thereby controlling the position and motion of the optical views of the object. An example of such a holding means is a stage; such a stage can be configured to quantify the relative distance of points-of-interest on the object to provide measurement capabilities. Where measurement capabilities are desired but a holding means is not desired or possible, a mounting system capable of controlling the position and motion of the optical views of the object can be configured.

In other aspects, methods relating to the invention will also be disclosed, namely methods providing for: (i) focusing on the magnified image with the user's foveal vision while viewing a manipulation of a tool with the user's peripheral vision, (ii) focusing on the manipulation of a tool with the user's foveal vision, while viewing the magnified image of the object with the user's peripheral vision, (iii) focusing on the magnified image with the user's foveal vision and manipulating the object, wherein the manipulation of the object is viewed in high-resolution in real-time in the magnified image.

While preferred embodiments of the apparatus and methods described contemplate medical surgery as an exemplary application, the present invention as disclosed can be utilized in a variety of industries, products and professions.

It is to be understood that the details of the various embodiments and aspects of the present invention can be implemented in any combination without departing from the spirit and scope of the invention.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 10 is a perspective view of an embodiment of the present invention illustrating a desktop stereoscopic imaging workstation utilizing a single flat LCD display as a stereoscopic display means.

FIG. 12 is a perspective view of an embodiment of the present invention illustrating a desktop stereoscopic imaging workstation utilizing separate left and right views with a barrier as a display means.

DETAILED DESCRIPTION OF PREFERRED EMBODIMENTS

Figure 1A:
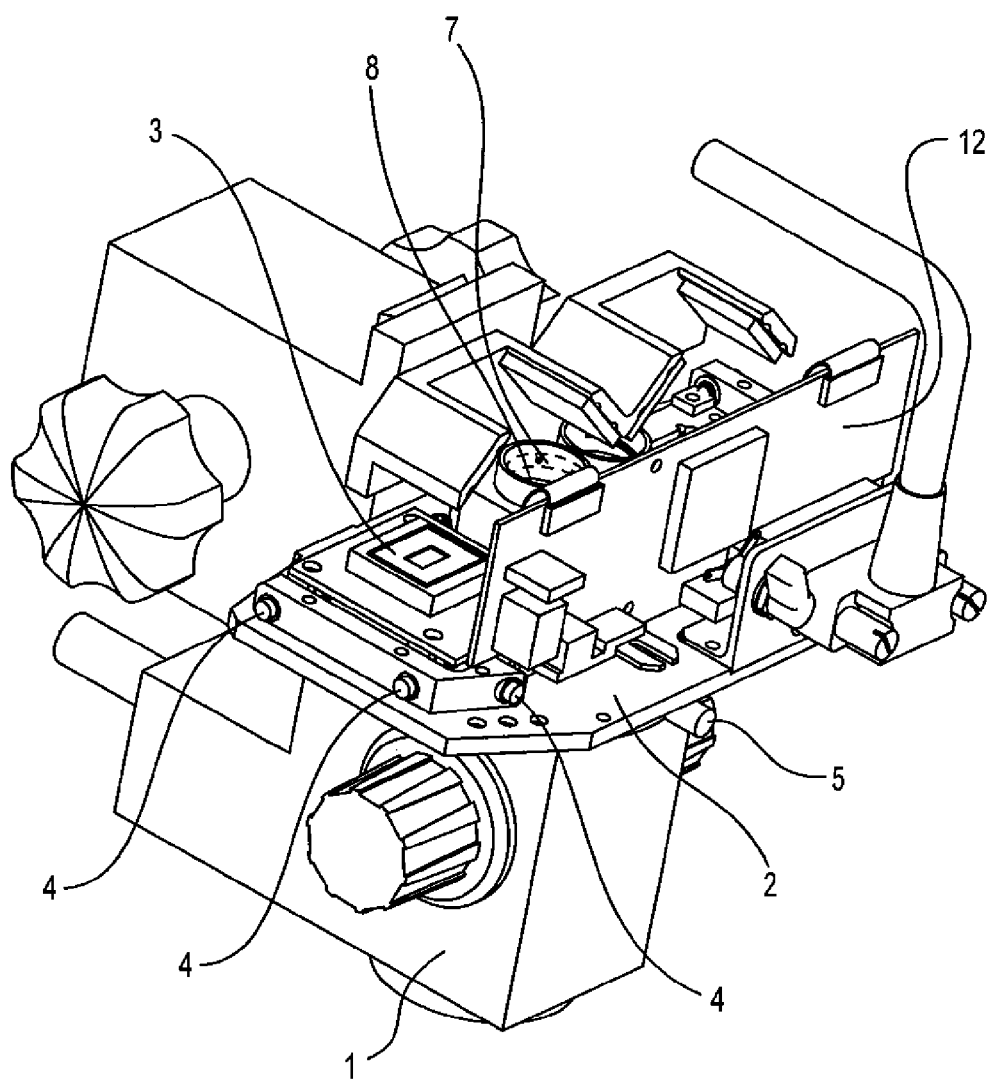
FIG. 1A is a top and side perspective view of the stereoscopic image acquisition device according to an embodiment of the present invention.

In the following description, for the purposes of explanation, specific details are set forth in order to provide a thorough understanding of the invention. However, it will be apparent that the invention can be practiced without these specific details. In other instances, well-known structures and devices are depicted in block diagram form in order to avoid unnecessary obscuring of the invention. Section titles and references appearing within the following paragraphs are intended for the convenience of the reader and should not be interpreted to restrict the scope of the information presented at any given location.

Various aspects and features of example embodiments of the invention are described in more detail hereinafter in the following sections: (i) Definitions, (ii) Functional Overview, (iii) Stereoscopic Image Acquisition Device, (iv) Display Means, (v) Stereoscopic Electronic Microscope Workstation and (vi) Conclusion.

I. DEFINITIONS

Before addressing details of embodiments described below, some terms are defined or clarified. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

As used herein, the term "compact" when used to describe a stereoscopic acquisition device is intended to mean a device with physical dimensions small enough that manual operation of attached modules, including but not limited to viewing modules such as eyepieces or imaging modules such as microscopes, is not significantly restricted.

As used herein, the term "data pathway" is intended to mean that physical connection between two devices, such as one or more wires, cables, fiber optics, or wireless connections.

As used herein, the term "data stream" is intended to mean a continual movement of digital data or data structures within a device or between devices, perhaps while undergoing processing, conversion, or formatting.

As used herein, the term "data structure" is intended to mean the form in which digital data are addressed, handled, or manipulated, for example, as bytes, words, blocks, etc. Typically, digital data are formatted into particular data structures as required by the type of transmission, processing, or display that the data will undergo.

As used herein, the term "deflecting element" is intended to mean an optical element which can deflect an optical path either in part or in whole, including without limitation mirrors, prisms and beam-splitters.

As used herein, the term "display controller" is intended to mean a component of an image acquisition or processing system which is designed to convert a logical representation of an image stored in memory to a signal that can be used as input for a display medium, most often a monitor utilizing a variety of display standards. A display controller can also provide functionality to manipulate the logical image in memory.

As used herein, the phrase "folding the optical paths" is intended to mean deflecting the path towards an intended direction using one or more deflecting elements.

As used herein, the term "formatting" when referring to data is intended to mean structuring or restructuring the digital form of the data prior to transmission, processing, or display.

As used herein, the term "high-resolution" when referring to stereoscopic images is intended to mean at least 1280 by 720 pixels (1280×720) for each left or right view. It is contemplated that resolutions of three times and eight times this minimum resolution can be implemented depending on the state of technology for sensors and displays and depending on what cost is acceptable. On the other hand, the devices of the present invention can be implemented without limitation with higher or lower resolutions for either one or both of the views.

As used herein, the term "high-speed data pathway" is intended to mean a data pathway that is capable of data transmission rates required for real-time, high-resolution stereoscopic images, typically about 1.5 gigabits per second or greater. The transmission rate can be in a range from about one to three gigabits per second for a resolution of approximately 1280×720 to 1920×1080 pixels for each of left and right view. Alternatively, resolution of approximately three times the specific minimum set forth above can operate with a high-speed data pathway having transmission rates of about ten gigabits per second. This higher transmission rate and resolution has the advantage of improved color rendition. An even higher resolution of approximately eight times the specific minimum set forth above, which also about matches the human eye in resolution and color rendition, can operate with high-speed data pathways having transmission rates of approximately several hundred gigabits per second.

As used herein, the phrase "high-speed data stream" is intended to mean that the data flow is fast enough to enable high-resolution stereoscopic images to be transmitted in real-time.

As used herein, the term "imaging optics" is intended to mean those optical elements that form an image on the focal plane of a sensor, including without limitation lenses and non-planar mirrors.

As used herein, the term "moving-image" when referring to a type or group of images or cameras is intended to mean images captured or displayed at a speed sufficient that a human eye perceives the sequential presentation of the images as continuous motion.

The term "optical" is intended to mean of or relating to or involving light or optics, including without limitation the use of visible radiation and non-visible radiation to visualize objects.

As used herein, the term "optical element" is intended to mean a part of an optical system which deflects, refracts, restricts, focuses, manipulates, mirrors, modifies, filters or has some other intended effect on a beam of light including without limitation lenses, prisms, mirrors, and beam-splitters.

As used herein, the phrase "optical imaging module" or "imaging module" is intended to mean a component part of an optical instrument, or a corresponding assembly of component elements, that is required for imaging an object in the optical path of the instrument, including without limitation the body of an optical imaging instrument or a microscope without the eyepieces.

As used herein, the term "optical instrument" is intended to mean any optical system of optical elements capable of generating stereoscopic images including without limitation microscopes, endoscopes, binoculars, telescopes, and optical imaging modules.

As used herein, the term "optical path" is intended to mean the generally central ray in an optical system. Should the system have no central ray then the optical path is the general centerline of the average of all the rays.

As used herein, the term "optical viewing module" or "viewing module" is intended to mean a component part of an optical instrument, or a corresponding assembly of component elements, that is required for viewing an object in the optical path of the instrument, including without limitation an eyepiece module of a microscope.

As used herein, the phrase "real-time" or "in real time" is intended to mean that the image data is acquired, processed, transmitted, or displayed at a sufficiently high data rate and at a sufficiently low delay that objects on a display move smoothly without user-noticeable judder or latency. Typically, this occurs when new images are acquired, processed, and transmitted at a rate of at least about 30 frames per second (fps) and displayed at about 60 fps and when the combined processing of the system has no more than about $\frac{1}{30}^{th}$ sec of delay. It is possible that individual components of a system be real-time while one or more other components are not, in which case the entire system would not be a real-time system.

As used herein, the term "sensor" is intended to mean an imaging sensor, that is, a small electronic device ("chip")

which contains an array of individual light-sensitive sensors, each of which records a small element of the image (or "pixel").

As used herein, the term "stereoscopic image" or "stereoscopic magnified image" is intended to mean a single image consisting of at least two views, one corresponding to a left-eye view, i.e. the left view, and one corresponding to a right-eye view, the right view.

As used herein, the terms "stereoscopic microscope" and "stereomicroscope" are synonymous and intended to mean a microscope comprising of at least two views, one corresponding to a left-eye view, i.e. the left view, and one corresponding to a right-eye view, the right view.

As used herein, a "user" is intended to mean an operator or viewer of the apparatus utilized or method performed. A user is not limited to representing a single person, and can be any number of persons, operators or viewers utilizing the apparatus or performing the methods disclosed herein. Additionally, in other embodiments it is anticipated that a "user" can also represent one or more non-human biological bodies (e.g. one or more monkeys) or man-made devices (e.g. one or more robots), or other devices (e.g. manufacturing quality control devices) utilizing the apparatus or method disclosed herein.

II. FUNCTIONAL OVERVIEW

Embodiments of the invention relates to a compact stereoscopic image acquisition device capable of acquiring stereoscopic images from an optical instrument, such as a stereomicroscope or imaging component thereof, and workstations providing a display means in an ergonomic posture for the use of such apparatus.

Generally speaking, devices according to the present invention acquire and transfer high-resolution, real-time image data from stereoscopic still or moving images, to image processing units, recording devices, or one or more displays. Such devices according to the present invention typically perform the desired functions without protruding elements, numerous cables and connectors, and other additional components such as eyepieces, and can be readily adapted for use with a variety of optical instruments.

Embodiments of the present invention can also be used with present art optical instruments. The stereoscopic image acquisition device attaches to the body of an optical instrument, replacing the optical viewing module of the instrument. A coupling mechanism is used to attach the device to the instrument and to align the device's optical paths with the left and right optical axes of the optical instrument. The coupling mechanism includes elements on the rigid base of the device which interface mechanically with elements on the instrument to automatically and rigidly align these axes upon installation of the device on the optical instrument. The coupling mechanism can be adjustable.

A second coupling mechanism is used to attach an optical viewing module to the device. In this embodiment, the user can view the object under the optical instrument either via an electronic image in a display or via the viewing module. The second coupling mechanism is adjustable.

The optical viewing module replaced by the device is an eyepiece module. In a further embodiment of the invention, the coupling mechanism automatically aligns the optical paths of the device with the optical paths of the viewing module. The optical instrument can be a microscope, and preferably a stereomicroscope.

The optical properties of the optical instrument are built into the stereoscopic image acquisition device in order to provide the images otherwise formed by the optical instrument. Hence, no additional optical instrument, or imaging component thereof, is required. In one embodiment of the invention, a coupling mechanism can be used to attach an optical viewing module to the device. In this embodiment of the invention, the user can view the scene under the optical instrument either via the electronic image or via the viewing module.

Embodiments of the present invention can also include one or more of: (1) synchronously controlled, high-resolution, real-time sensors adapted for acquiring image data from the left and right stereoscopic images transmitted from the optical instrument; (2) an adjustment mechanism for aligning the position of the sensors to the at least one optical path of the device; (3) an integrated controller for controlling the at least one sensor and acquiring, processing and transmitting real-time image data; (4) another adjustment mechanism for adjusting the focus of the optical paths within the device; (5) yet another adjustment mechanism for adjusting the magnification of the optical paths within the device; (6) adjustable irises which can operate in tandem; (7) a further adjustment mechanism for adjusting the irises simultaneously; (8) filter components and (9) a replacement mechanism for replacing or changing the filter components.

In another embodiment of the invention, the device comprises one sensor. In yet another embodiment of the invention, the device can include two, three, or six sensors. The image data transmitted typically comprises a resolution of at least 1280×720 pixels for each view. Embodiments of the invention can also comprise a deflecting element can be inserted into an optical path between an object imaged by the optical instrument and the main objective of the instrument. In some applications, it is also advantageous to include a display controller for converting the image data to display signals.

A method according to the present invention provides high-resolution, real-time stereoscopic images from an optical imaging instrument or imaging module to a display or recording device. The method can include one or more of: (1) combining real-time image data acquired from the left and right views of the stereoscopic images into a single data structure, (2) processing the image data, and (3) transmitting a sequence of single data structures in real time to a stereoscopic display or storage device. The stereoscopic images can be acquired by the stereoscopic image acquisition device of the present invention.

Embodiments of the present invention can also include a method for decreasing the physical dimensions of an optical device that replaces the optical viewing module of an optical instrument. This method can be achieved by placing an optical element or component before a deflecting element in the optical path of the device, or an associated optical instrument, where an optical image is focused on an image sensor. The present invention can also include a device and implement a method where the size and direction of the optical paths is manipulated to further optimize the size and shape of the device. For this method, the optical device that is utilized can be the stereoscopic image acquisition device of the present invention.

A stereoscopic image processing system can comprise one or more of: (1) an optical instrument for generating stereoscopic images; (2) a stereoscopic image acquisition device for acquiring and transmitting high-resolution, real-time stereoscopic image data; (3) an acquisition controller for acquiring, processing, and transmitting the stereoscopic image data in real time; and (4) a stereoscopic display system for displaying stereoscopic images. In some embodiments of the invention, the optical instrument, or an optical imaging module thereof, can be coupled to the device. As desired, such an optical imaging module can be shared with and integrated into the device.

Embodiments of the present invention can also include a display controller integral with the device for converting the image data to display signals. The display controller can combine stereoscopic image data from the left and right views of a stereoscopic image into a single data structure and transmit a sequence of such data structures as a data stream to a stereoscopic display means or recording device.

In preferred embodiments according to the present invention, it is desirable to utilize at least two high-resolution, real-time sensors adapted for acquiring image data from the left and right views of a stereoscopic image which the controller can control simultaneously. The controller component can comprise an optical or wireless high speed pathway, or both.

In certain applications, it is desirable to insert a deflecting element into an optical path between an object imaged by the optical instrument and the main objective of the instrument. The optical instrument can be a microscope or a stereomicroscope.

Having provided a function overview of various applications, specific embodiments and their respective components and characteristics shall now be discussed in conjunction with the attached figures.

III. STEREOSCOPIC IMAGE ACQUISITION DEVICE

The present invention relates to a compact, stereoscopic image acquisition device capable of acquiring stereoscopic images from an optical instrument such as a stereomicroscope, or a component thereof, and providing high-resolution, real-time data from still or moving stereoscopic images to image processing, recording, and display systems. Embodiments of the present invention typically perform the desired functions without the inconvenience and clutter of protruding elements, numerous cables and connectors, and additional components. Other features and advantages of the invention will be apparent from the following detailed description, and from the claims.

Figure 1B:
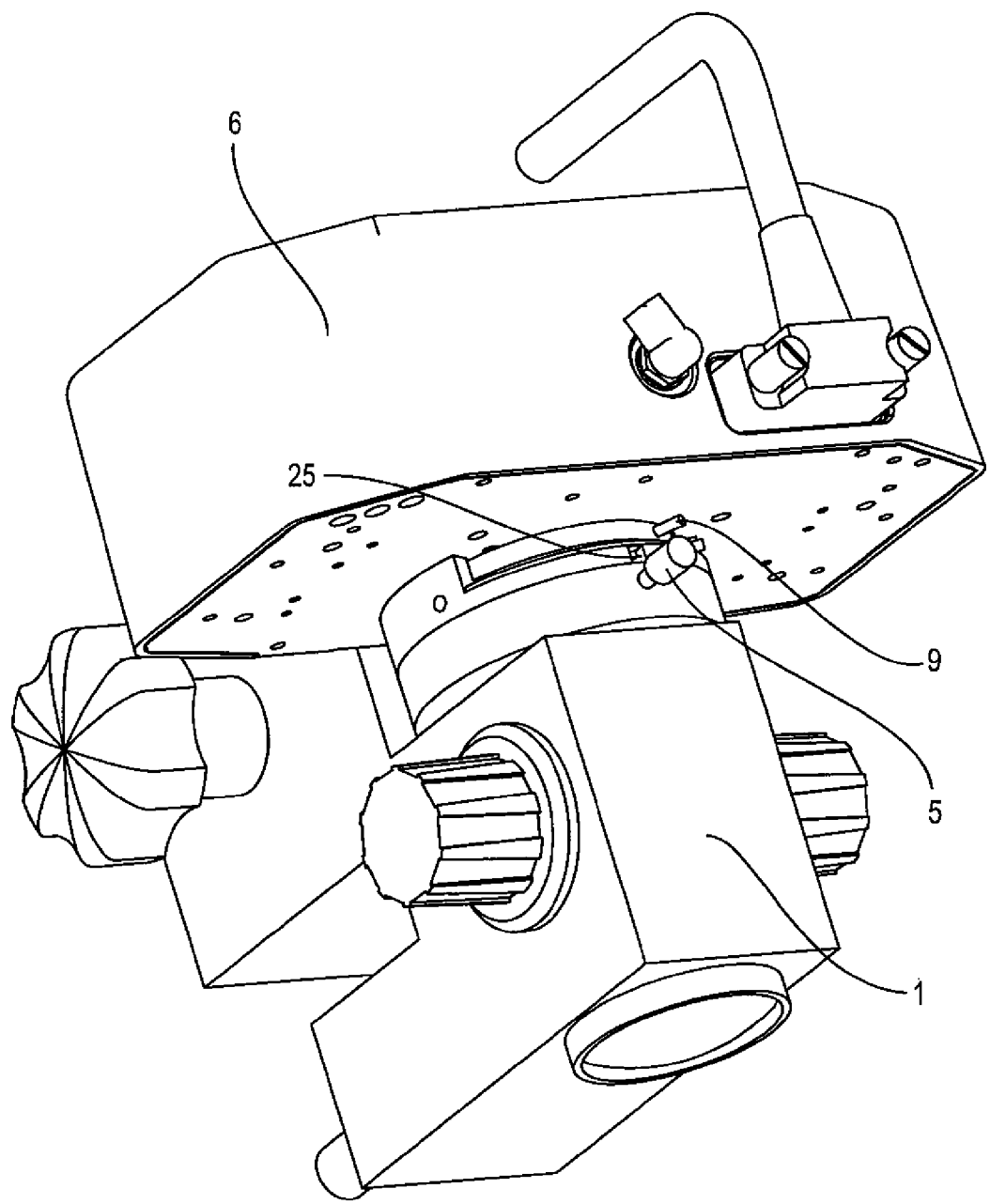
FIG. 1B is a bottom and side perspective view of the stereoscopic image acquisition device of FIG. 1A.

Attention is now directed to more specific details of embodiments that illustrate the invention, without limitation. FIG. 1A and FIG. 1B illustrate an embodiment of the invention where the stereoscopic image acquisition device is coupled to the optical imaging module of an optical instrument, replacing the viewing module of the instrument.

In the illustrated embodiment, the optical instrument is a stereomicroscope 1, the imaging module is the body of the microscope, and the stereoscopic image acquisition device has replaced the original eyepiece module of the microscope. The compact nature of the device, allowing ready access to the controls of the microscope, is evident. The mounting of the device is not prone to misalignment, due to the rigidity of the baseplate 2, and cables to the device therefore have insignificant leverage on the mounts, such that unintended pulling on a cable does not result in a significant deflection of the device. In the pictured embodiment, the sensor(s) 3 affix to the baseplate 2 and are aligned to the optical path(s) of the device via an adjustment mechanism 4, and this apparatus holds the sensor(s) in alignment with the optical path(s) of the device, and consequently, in the alignment with optical path(s) of the optical instrument.

The device of the present invention is coupled to the stereomicroscope in such a manner that the device's optical paths are automatically aligned with the left and right optical axes of the microscope. In general, the mechanical coupling on the rigid baseplate 2 duplicates that of the eyepiece module that it replaces. In one embodiment, the baseplate has a generally conical protrusion on the bottom to fit within a mating receptacle found on numerous models of microscope bodies from various manufacturers. In this embodiment, the baseplate 2 is secured with a single clamping screw 5 to the microscope body and is uniquely positioned by its alignment feature, a groove that accepts an alignment pin on the microscope body. Other embodiments of the rigid baseplate 2 have an adjustment mechanism for adjusting the distance between the optical path(s) and an alignment feature so that the alignment can be corrected for varying models of optical instruments. Such mechanisms can include without limitation spacers, linkages, slotted holes and other apparatuses known to those skilled in the art. In the case where the receptacle in the optical instrument is larger than the optimal size for the baseplate 2, an embodiment of the baseplate 2 can be adjusted by adding or moving bosses around the outside of the conical protrusion, or by substituting a different size conical protrusion, such that the resultant optical alignment is achieved.

The device requires fewer mounting parts to install on a microscope, resulting in more reliability and less cost than prior art. In one embodiment, the device can be removed or installed through loosening or tightening of a single thumb-screw, using no tools.

As shown in FIG. 1B, the device can be contained within a housing 6 that covers and protects the internal components and can provide electromagnetic shielding. The device does not protrude significantly from the general body of an optical instrument. Sensors 3 are mounted in a way that is not fragile and prone to breakage. The housing 6 can be designed to protect the internal components and to not interfere with existing microscope knobs and controls. The housing 6 can be designed such that cleaning and disinfection can be accomplished easily and liquid ingress prevented so that the system can be used in a hospital operating room, clean room, or similar environment.

Within the housing 6 is an adjustment mechanism 7 (shown in FIG. 1A) to focus the imaging optics 8 (shown in FIGS. 1A and 3) so that each device is interchangeable with another without the need to re-focus. Therefore, the device can save valuable time in time-critical situations, such as medical emergencies, because it does not need to be focused after mounting the system on a microscope. One preferred mechanism for focusing is a lens barrel wherein the barrel contains a helical track or thread such that rotation of the barrel results in an axial movement of the barrel, changing the distance along the optical path from the imaging optical element to the sensor focal plane, thus achieving focus. Such a system can be motorized such that a user can change the focus remotely. Other focusing mechanisms can include without limitation a lens barrel inside a cylindrical bore, such barrel being secured by a fastener or a rack-and-pinion device whereby the distance from the imaging optics to the focal plane is adjusted by rotating the pinion, either manually or via a remotely-operated motor.

The device can also contain an adjustment mechanism to change, under user control, the magnification (or "zoom") of the optical system. These mechanisms, commonly known to practitioners in the optical art, can be manual or motor-driven.

As stated above, the device also contains an adjustment mechanism 4 to adjust the position of the sensors 3 in order to align them with the optical axes of the device. This adjustment allows precise individual positioning of the imaging sensor to match image windows for best stereopsis. Mechanisms for aligning the sensors include without limitation mechanical components including jackscrews, cams, or other components known in the art to precisely move the sensor or a mechanical component to which the sensor is fastened. Following this alignment procedure, the sensor 3 can be fixedly attached to the baseplate 2 or other rigid structure by a clamping screw or other mechanism.

In addition, as shown in FIG. 1B, the device has a replacement mechanism 9 to insert or remove filter elements 10 (shown in FIG. 3) relative to the optical paths. These replacement mechanisms can include without limitation wheel or slider plates holding the filters, which can accomplish this simultaneously for both optical paths. Filter elements, including without limitation IR blocking, selective color, and other types of filters, are thereby inserted or removed together, quickly and simultaneously, resulting in increased ease-of-use and faster and more error-free operation than the prior art. In the case of IR blocking filters, when they are partially or completely removed, the image becomes much brighter because of the high sensitivity of CMOS and CCD sensors to IR radiation. This can be used to great advantage in some applications, such as in eye surgery, scientific research, and low-light inspection.

Optionally, as shown in FIG. 1B, the device can also have an iris adjustment mechanism 25 for each optical path, control of which is done in tandem by the user while watching a live image. Irises are adjusted simultaneously via a mechanical linkage in the device, assuring that equal amounts of light enter each sensor and providing increased ease-of-use and faster, more error-free operation than in the prior art. Such adjustment mechanisms can be manually operated by the user or remotely operated using a motor or actuator.

As shown in FIG. 1A, the device also contains a controller 12 connected to the sensor. In one embodiment of the invention, the controller is an acquisition controller which performs the following functions: (1) controlling the electronic functions of the sensors; (2) acquiring and processing data generated from a left view and a right view of a stereoscopic image detected by the sensors; (3) combining stereoscopic image data from the left view and the right views into a single data structure; and (4) transmitting the single data structure in real-time to at least one other device, such as a display.

Figure 2:
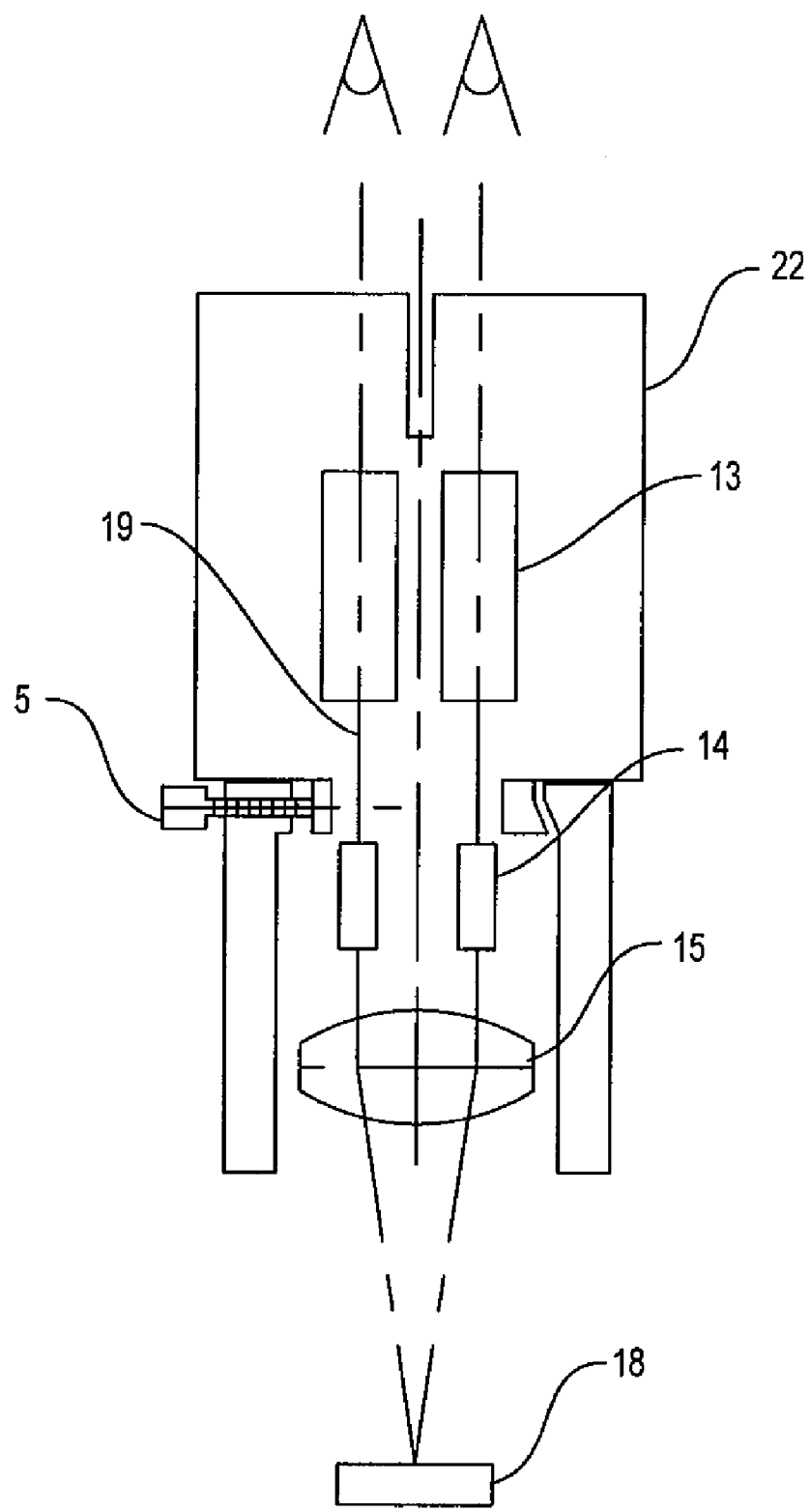
FIG. 2 is a schematic diagram of the optical principles of a typical stereomicroscope having eyepieces.

FIG. 2 shows the optical elements, including eyepiece optics 13, zooming optics 14 and the main objective 15 and optical paths 19 of a typical stereomicroscope with eyepieces.

Figure 3:
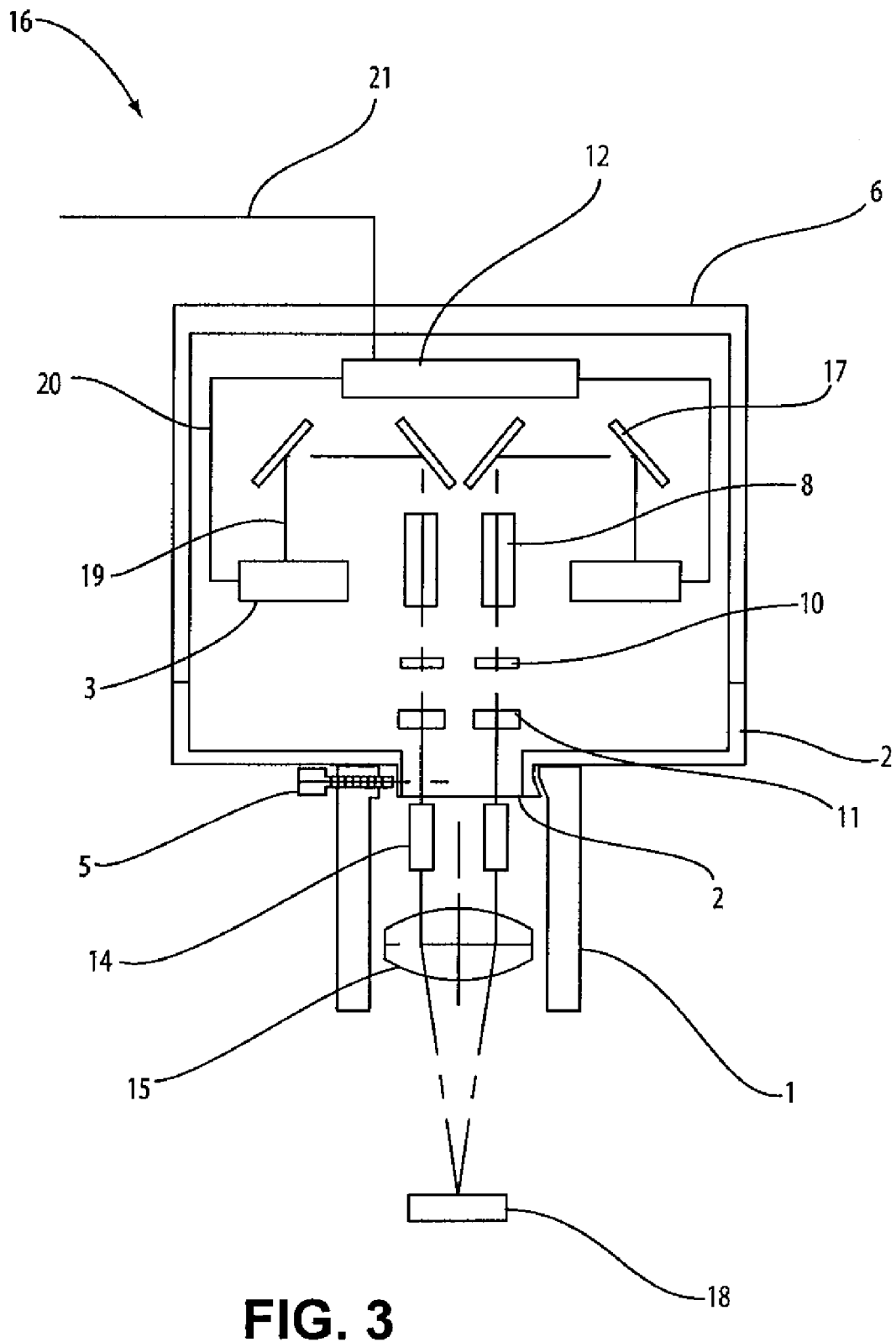
FIG. 3 is a schematic diagram of the optical principles of a typical stereomicroscope in which the eyepieces are replaced by the stereoscopic image acquisition device according to the present invention.

An embodiment of the stereoscopic image acquisition device 16 coupled to a stereomicroscope 1 is shown in the schematic diagram of FIG. 3, including imaging optics 8 and deflecting elements 17 for controlling the optical path and forming images on the one or more sensors 3 of the stereoscopic image acquisition device 16. This embodiment contains two optical paths, each with generally similar construction and optical components. Although FIG. 3 shows an embodiment of the stereomicroscope 1 having a single main objective 15, alternative embodiments of the microscope can have more than one main objective for forming the left and right images of the object 18 being imaged.

The main objective 15 of the stereomicroscope 1 forms images of the object 18 being imaged, which can be magnified by zooming optics 14 along the optical paths 19 of the microscope. Each optical path of the stereomicroscope 1 is aligned to the respective optical path 19 of the device 16 by the rigid baseplate 2 which is secured to the stereomicroscope 1 by the clamping screw 5. Each optical path 19 proceeds thru an adjustable iris 11, the diameter of which the user can adjust in tandem with the other. Each optical path 19 then proceeds thru a region in which a filter 10 can or cannot be inserted by the user (See FIG. 1B). Each optical path 19 then proceeds through imaging optics 8 and deflecting elements 17 before forming an image on the sensor 3. Sensor control signals for optimizing sensor acquisition parameters and providing timing for synchronous acquisition are transmitted on the sensor pathway 20 (See FIG. 7) between the sensors 3 and the acquisition controller 12. Image data corresponding to each view is sent from the sensor 3 back to the acquisition controller 12. Within the acquisition controller 12, the data from each view are processed, combined into a single data structure, and transmitted over a high-speed data pathway 21 (See FIG. 7). The acquisition process repeats continually and automatically.

The acquisition controller 12 contains one or more electronic circuits that control all sensors without the necessity of a separate CCU for each sensor. The controller 12 can also provide, without limitation, the following functionalities:
1. Powering the sensors and sending parameter settings to them, such settings can be stored in memory or input by the user;
2. Polling the sensors to determine their settings and verify proper operation;
3. Sending timing signals to the sensors simultaneously to activate them to generate data;
4. Acquiring stereoscopic image data by combining the simultaneous data from the sensors into a single data structure, repeating this acquisition at a rate sufficient to display real-time stereoscopic image to the user;
5. Performing formatting and conversion of the raw data stream into a stream of stereoscopic image data; and
6. Transmitting the stereoscopic image data to other devices, such devices including image processing and storage units, display units and networks for remote transfer.

Additional optional features and operations of the acquisition controller 12 can include:
1. Saving sensor parameters to reset the sensors to the user's desired settings or to default values;
2. Adjusting left and right image attributes in a technique known in the art as Automatic Gain Control, applied to both sensors independently or together;
3. Matching left and right image attributes through filters controlling brightness, contrast and a value known in the art as gamma, applied to both sensors independently or together;
4. Diagnosing problems with the sensors and taking steps to mitigate problems; and
5. Performing white balance calibration to both sensors independently or together.

In addition, the acquisition controller 12 can also contain circuitry to reduce electromagnetic emissions as well as to reduce susceptibility of electromagnetic interference from other electronic devices sources.

Figure 4A:
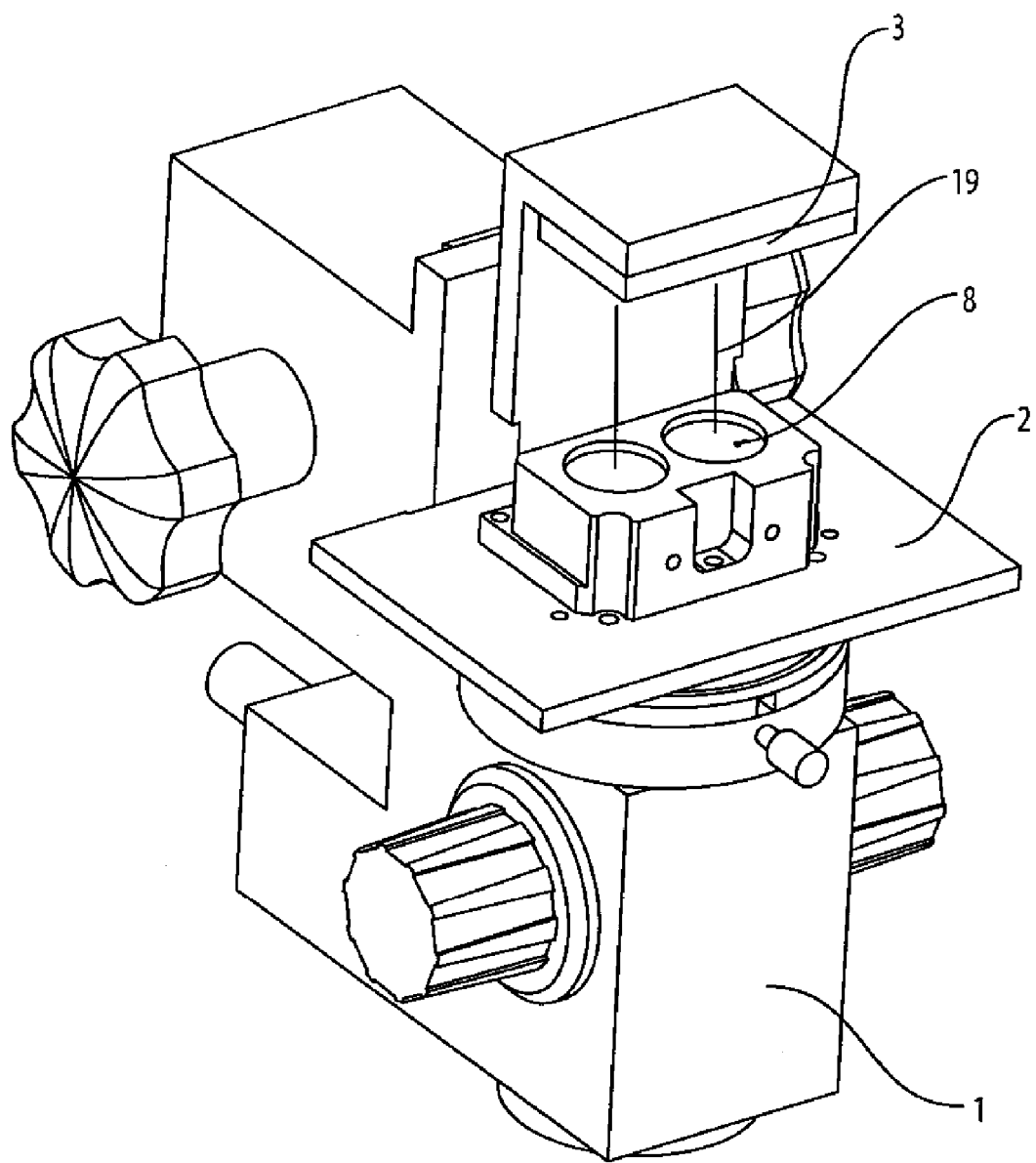
FIG. 4A is a top and side perspective view of a device having a straight pattern for the optical paths of the device according to an embodiment of the present invention.
Figure 4B:
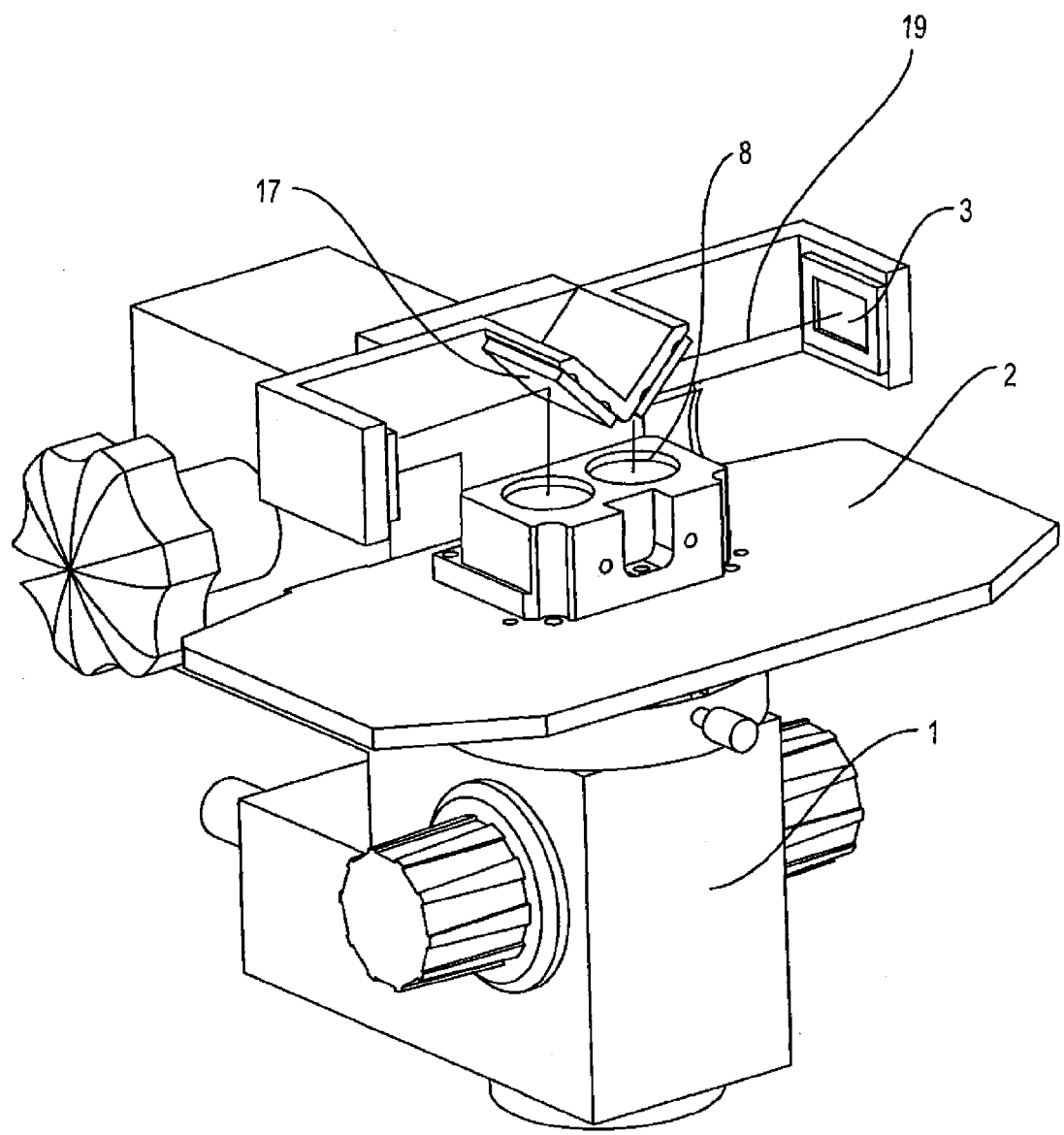
FIG. 4B is a top and side perspective view of a device having a pattern having one fold for the optical paths of the device according to an embodiment of the present invention.
Figure 4C:
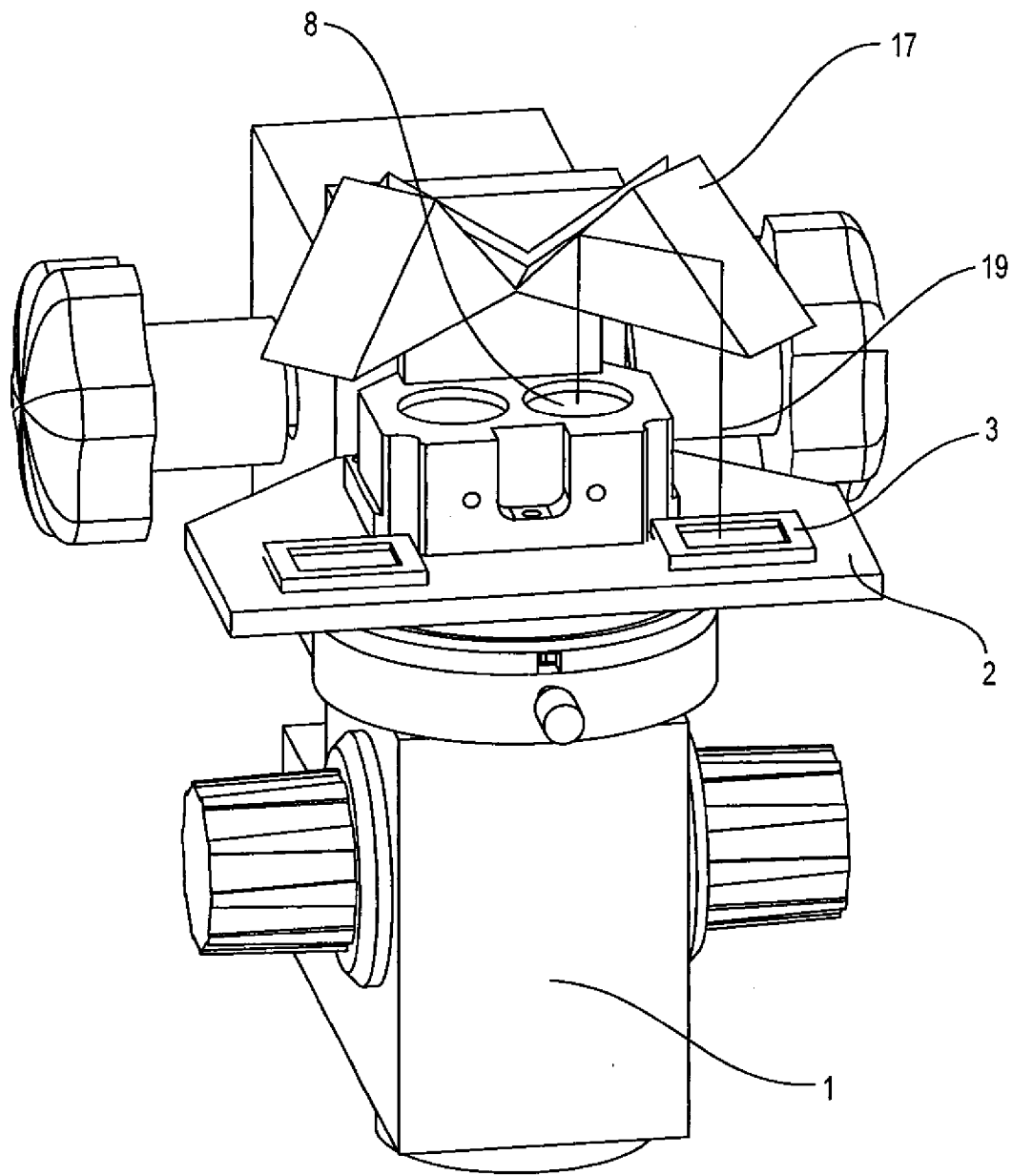
FIG. 4C is a top and side perspective view of a device having a pattern for the optical paths of the device having two folds according to an embodiment of the present invention.

In an embodiment where the device replaces eyepieces, the optical path 19 no longer needs to couple to eyepieces, so the path can be modified by using imaging optics 8, followed by deflecting elements 17 to fold the path to make the overall product smaller, rather than placing the deflecting element(s) first, as in the prior art. This has the effect of reducing the overall optical path length significantly and reducing overall device size. FIGS. 4A, 4B, and 4C show schematic diagrams of possible patterns for the optical paths 19 of the device. In a first embodiment, the optical paths 19 can be straight, as shown in FIG. 4A. This embodiment can include, without limitation, one imaging sensor 3. In a second embodiment shown in FIG. 4B, the optical paths 19 can have one fold. The directions of the folded paths do not need to be parallel or orthogonal to the plane that contains the incoming optical paths or to each other, as shown in FIG. 4C. In a third embodiment, the optical paths 19 can have two folds, as shown in FIG. 3. In other embodiments, the optical paths can cross each other or can have other straight, folded, or non-planar optical paths, as required for the optimum size and shape of the device. Because the optical path from the imaging optics to the sensors is not restricted by the use of an off-the-shelf camera, as is typical in the prior art, the sensors, deflecting elements and imaging optics of the present invention can be easily located within the housing. The present invention allows optical paths to be folded, resulting in a smaller product size and one that avoids interference with knobs, controls and other external items.

The stereoscopic image acquisition device includes at least one, and typically two, imaging sensors 3 which can be, without limitation, of the type known in the art as complimentary metal-oxide semiconductor (CMOS) sensors. Sensors made with CMOS technology use significantly less power than CCD sensors. This simplifies the wiring and power supplies for the system and allows a simple housing design to dissipate the heat from the sensors and electronics, resulting in less cost and complexity than the prior art. The sensors do not need to conform to the NTSC or PAL standard; preferably they are high-resolution sensors. That is, their pixel count is much greater than standard video. In one embodiment of the invention, the stereoscopic image data acquired by the sensors has a resolution of at least about 1280×720 pixels for each left or right view. They can conform to the HDTV standard, and they can be "progressive." That is, the raster scan can not be interlaced.

The sensors used in the device can be color-image sensors. That is, they produce red, green, and blue images for each view. If there are one or two sensors in the device, they can be of the "single-chip" variety. That is, color filters can be embedded in the sensor so that color images can be derived from them, following the appropriate color processing.

An alternative device for acquiring color images can also be used in the device. For example, a device known in the art as a "three-chip" imaging device can be used, in which three imaging sensors are used for each view. A beam splitting prism breaks the optical path into three identical copies and passes them off to the three sensors through three primary color filters. Each sensor receives the entire image; therefore, each color in the resultant image has the same, full, resolution as the sensors. Three-chip systems yield higher quality pictures, but cost more than one-chip systems. A stereoscopic image acquisition device based on the three-chip sensor system would contain six sensors in a dual-optical-path embodiment or three sensors in a single-optical-path embodiment.

In one embodiment, two sensors are used to collect the stereoscopic image data; the left view is formed on one sensor, and the right, on the other, as shown, for example, in FIG. 3. However, one sensor 3 can also be used as shown in FIG. 4A. Left and right views can be acquired on one sensor by either: (i) temporal multiplexing, that is, in time, the left image is first presented to the sensor and then the right and so on, or (ii) spatial multiplexing, that is, the individual sensing elements of the sensor are shared between the two views. In the latter case, left and right views can be formed on a single sensor by, for example, (a) putting the left view on one side and the right on the other, (b) putting one view on the top half and the other on the bottom, (c) interleaving the two views vertically, (d) interleaving the two horizontally, and (e) interleaving both vertically and horizontally. The case of the stereoscopic image being formed on one sensor 3 in a side-by-side manner is illustrated in FIG. 4A.

Figure 5:
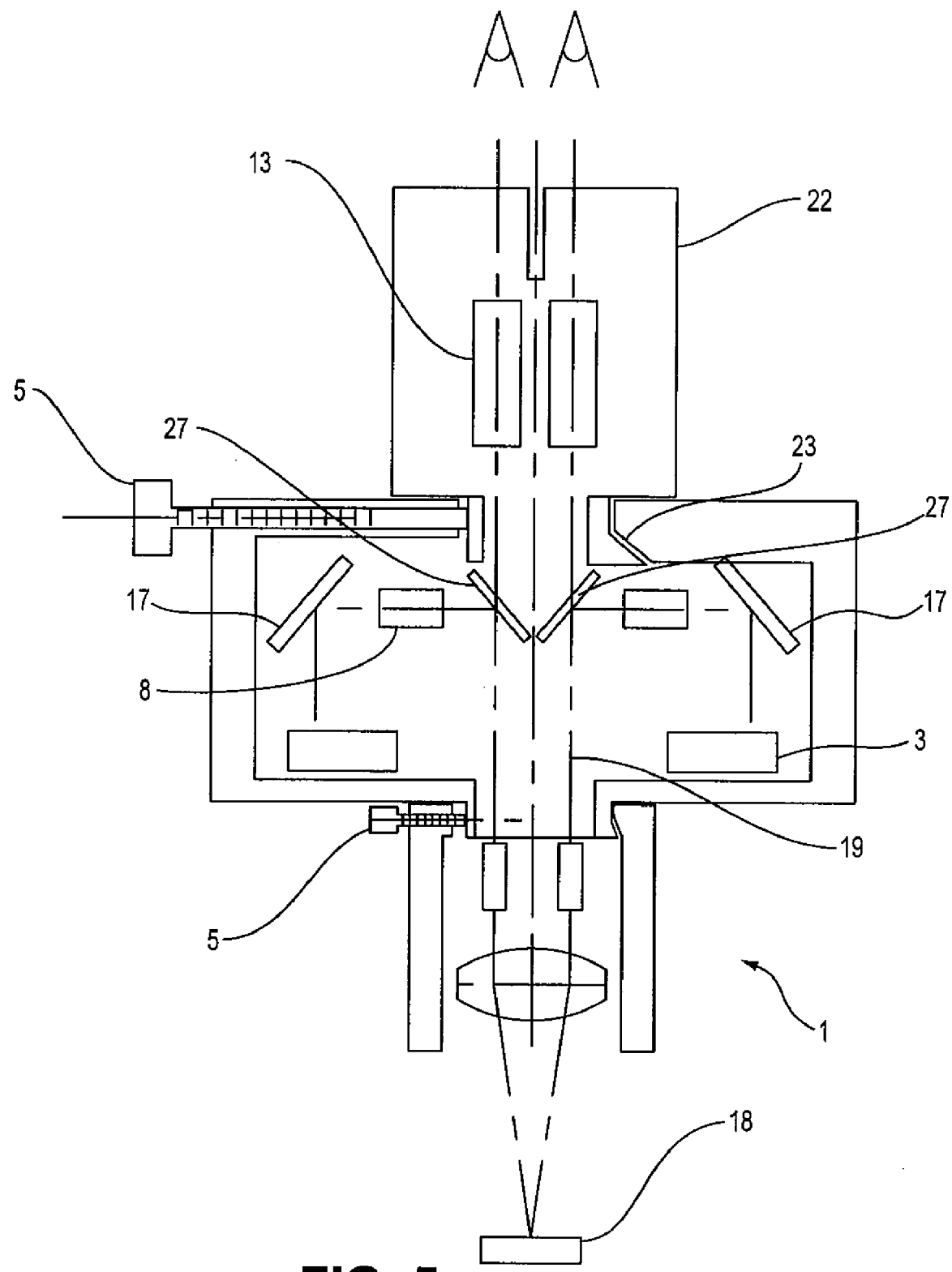
FIG. 5 is a schematic diagram of the optical principles of a typical stereomicroscope in which the eyepieces typically attached to the microscope have been replaced by a stereoscopic image acquisition device of the present invention, and where eyepieces have been attached directly to the device.

In another embodiment of the invention shown in FIG. 5, the device again replaces the eyepiece module 22 (See FIG. 2) of a stereomicroscope 1; however, an additional coupling mechanism can be provided for an optical viewing module, typically the eyepiece module 22, to attach to the device and for the user to use the eyepieces as usual. Hence, the user can view the scene under the microscope either via the electronic image or via the eyepieces. FIG. 5 shows a schematic diagram of the optical principles of the stereoscopic image acquisition device wherein the device has replaced the eyepieces of a conventional stereomicroscope 1 and the eyepiece module 22 has been attached to the device. The one or more of deflecting elements 17 of the first embodiment (FIG. 3), which served to deflect the entire optical path of the optical instrument in that embodiment, have been replaced by elements 27 that deflect only a portion of the optical path while allowing the rest of the path to reach the eyepiece module 22.

In such an embodiment, the eyepiece module 22 typically has a generally similar mechanical coupling as that described previously for the baseplate 2. The framework of this embodiment can then have a similar mating receptacle 23 on the device as described for the baseplate, such that the eyepiece module 22 can be automatically coupled to and fixedly aligned with the optical paths of the device.

Figure 6:
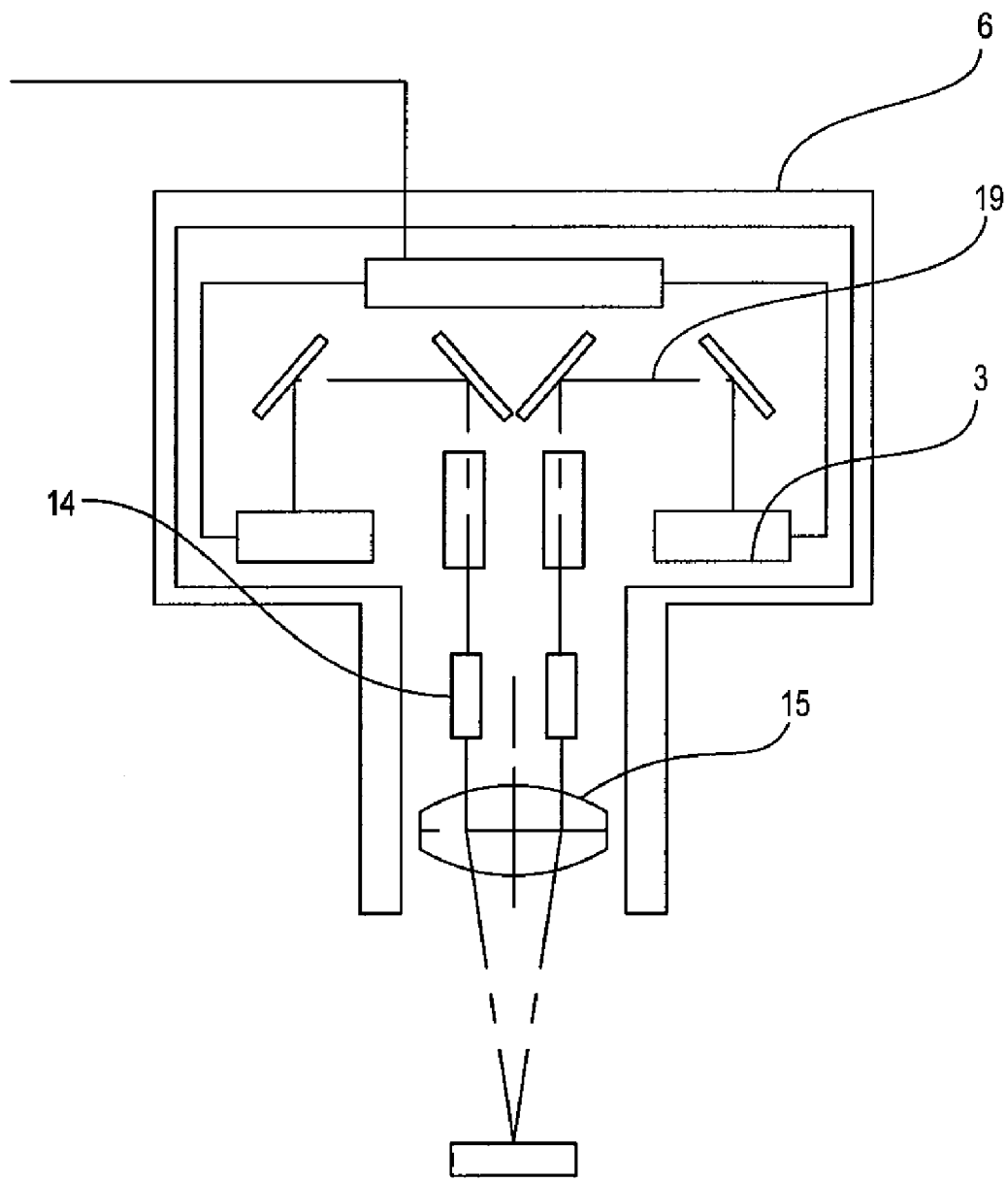
FIG. 6 is a schematic diagram of an embodiment of the present invention where optical properties of a microscope are built into the device.

In a further embodiment of the invention shown in FIG. 6, the optical elements of a stereoscopic optical instrument are built into the device. FIG. 6 thus shows a schematic diagram of the optical principles of the integrated device wherein the optical elements of a stereomicroscope, including zooming optics 14 and the main objective 15 as shown in FIG. 3, are now incorporated into the device. Thus this embodiment is a standalone device that does not require a stereomicroscope or an imaging module in order to acquire stereoscopic images.

In a further embodiment of the invention (not shown), the optical elements of an optical instrument are again built into the device. However, a coupling mechanism, as described previously in the second embodiment (FIG. 5), can be provided for the fitting and usage of eyepieces on an integrated device similar to that shown in FIG. 6. Hence, the user can view the scene stereoscopically either via the electronic image or via the eyepieces.

Figure 7:
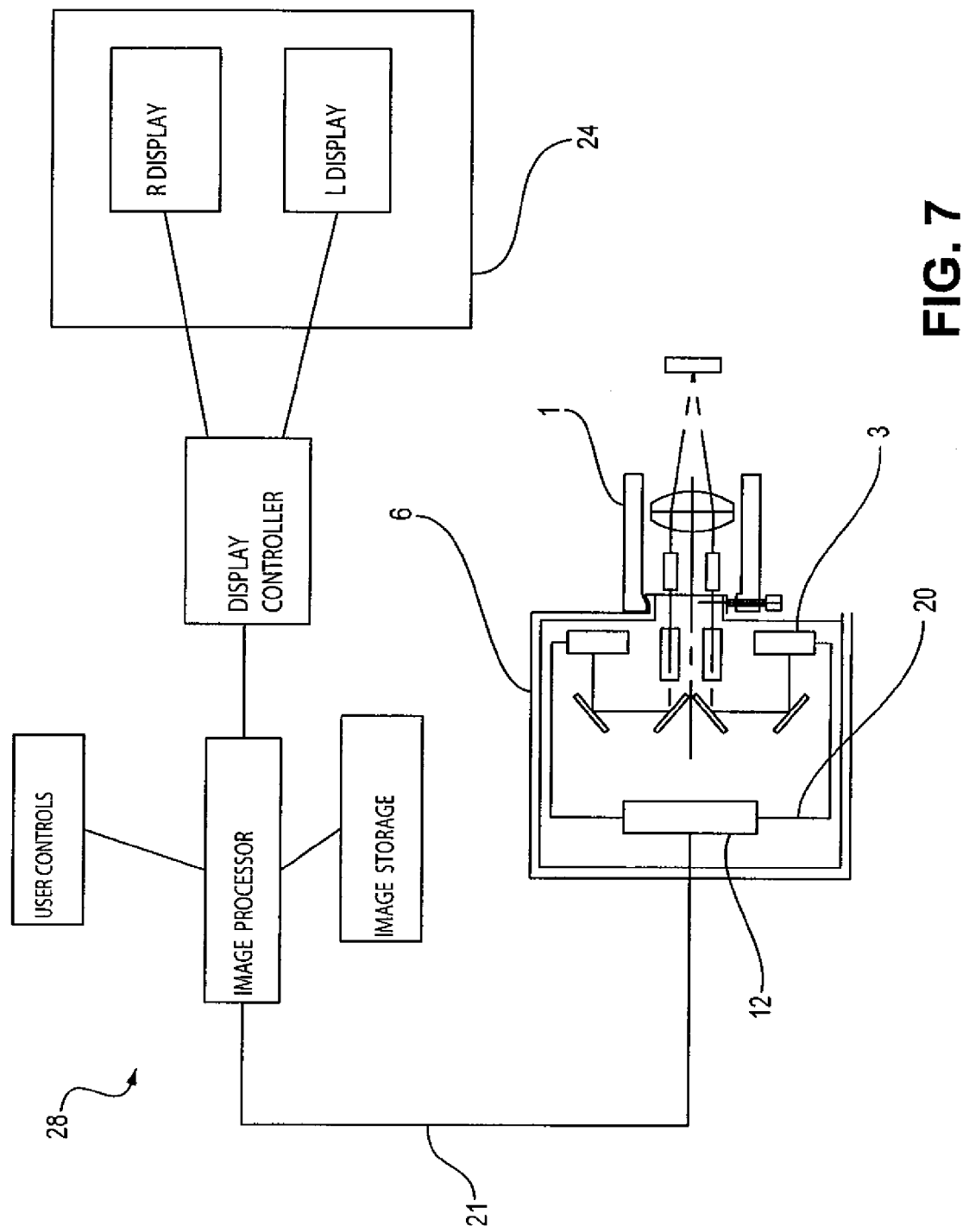
FIG. 7 is a schematic diagram of single data stream architecture for processing, storing, and displaying digital stereoscopic image data in real-time according to an embodiment of the present invention.

As shown in FIG. 7, digital image data can be continuously streamed to external devices, such as processors, computers, or display systems in a stereoscopic image processing system 28, via a high-speed data pathway 21. This high speed data stream is transmitted in real-time by one of several mechanisms. For example, one mechanism utilizes a plethora of signal lines transmitting in parallel to achieve the high data rate. Another mechanism utilizes one or more coaxial cables transmitting data in a generally serial manner. Another mechanism utilizes a wireless connection, that is, radio or other frequency transmission and reception. Another mechanism utilizes optical fiber wherein a laser can be modulated at sufficient frequency and in such a manner as to transmit the data at very high data rates.

IV. DISPLAY MEANS

The stereoscopic display means 24 of FIG. 7 can be, without limitation, one of several types. In a dual projector embodiment, each projector projects through a polarizer, with the two polarizers oriented orthogonal to each other. A user can wear orthogonally polarized spectacles. With such polarized spectacles being oriented to block the inappropriate polarized image and transmit the appropriate image, the right eye will see only the right image and the left eye will see only the left image and stereopsis is achieved. The differently-polarized spectacles can also be configured to have other differing optical properties, (e.g. different wavelengths/colors, etc.) to achieve the same desired result.

A second type of display comprises two LCD displays mounted obliquely to each other and a beam splitter mounted at the plane bisecting the angle between the two LCDs. The LCDs have polarizers such that stereopsis is achieved for a user wearing polarized spectacles as in the projector embodiment described above.

A third type of display, know in the art as a Head Mounted Display or HMD, comprises left and right small imaging displays and suitable optics mounted in a rigid spectacle-like frame such that each display presents its image to the appropriate eye of the user and stereopsis is achieved.

A fourth type of display comprises a fast-switching display that switches between left and right images. The user wears special spectacles containing shuttering devices in front of each eye such that the right eye shutter closes when the left image is presented on the display and similarly for the other eye such that stereopsis is achieved. The switching process is performed at a speed greater than the human perception limit such that a flickering image is not observed by the user.

A fifth type of display comprises the stereoscopic image views, left and right, vertically interleaved line-by-line in the display panel or tube, with a barrier grid or lenticular optical panel overlaid on the display such that the user's eyes can only see the appropriate display when the user is located in the proper location and stereopsis is achieved.

Figure 8:
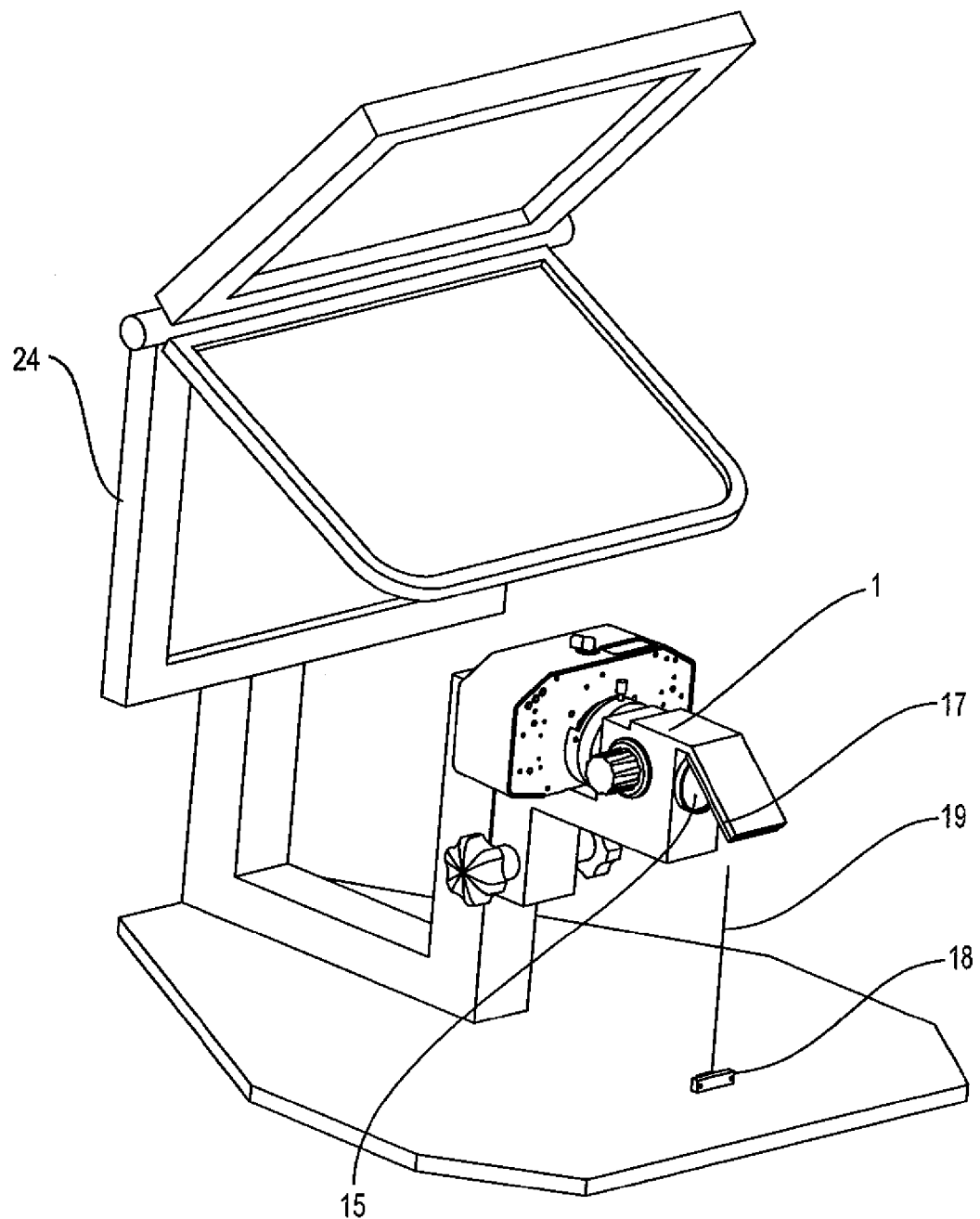
FIG. 8 is a perspective view of an embodiment in which a deflecting element is installed between an object and an objective lens of an instrument to which a device of the present invention is attached and where a stereoscopic display is attached to the device.

In a further embodiment of the device or system, a deflecting element 17 can be placed in the optical path 19 between the object 18 being imaged and the main objective 15 of the optical instrument 1 as shown in FIG. 8. This has the effect of deflecting the orientation of the optical path from generally vertical to generally horizontal, which has the further effect of reducing the overall height of the device and the optical instrument, allowing a user to more easily see over them. A stereoscopic display means 24 can be attached to the device in such a position that a user manipulating the object 18 manually will have a convenient view of it. Prior art did not allow the placement of the display in this position due to the height of the system; rather the display was located to one side or the other or much higher, resulting in an awkward working position for the user.

V. STEREOSCOPIC ELECTRONIC MICROSCOPE WORKSTATION

In practical applications such as the medical profession, preferred embodiments of the present invention typically comprise of a stereoscopic image acquisition device or "SIAD", a stereomicroscope that can be attached or built into the device, a stereoscopic display means as described above and further described below, and an image-processing unit or "IPU."

In another embodiment the invention relates in a similar manner to a system using two separate cameras, and a stereomicroscope that can be attached or built into the device, such system that provides a signal or signals to a stereoscopic display means which can or can not be attached, with or without the use and inclusion of an image processing unit, camera control unit or units, or similar device or devices. In the following descriptions the SIAD could be interchanged with the two cameras to achieve similar results with this embodiment.

More particularly, in the present art a high-resolution, real-time stereoscopic microscope workstation utilizing such multiple cameras directly connected to multiple display means has not been evidenced. As such, while a stereoscopic image acquisition device remains a preferred embodiment of the present invention, thereby providing numerous practical advantages, the present invention can also be embodied in a workstation utilizing multiple video signals from multiple video cameras without the use of a stereoscopic image acquisition device rendering a single image data stream. Embodiments of the present invention, therefore, are also directed to the ergonomic design of a stereoscopic microscope workstation utilizing more traditional video signal capture and transmission technologies.

Preferably, an image processing unit is attached to the workstation resulting in a complete, one-piece apparatus that provides all the necessary functionality including means for holding an object, forming a stereoscopic electronic image of it, processing such image data and displaying a possibly magnified, unmagnified, or de-magnified stereoscopic image of the object, in a desired orientation and condition (e.g. not inverted or reflected, or in any orientation desired by the user), on the stereoscopic display in a convenient position for the user, in real time. In other embodiments some or all of the functions of the IPU can be built into circuitry, firmware and software inside the SIAD or elsewhere in the system such that a separate IPU component can not be required, possibly reducing the size and cost of the system. In yet other embodiments, where physical size of the image processing unit is a constraint, the image processing unit can be separately located in an alternate desired location, such as an central computer room or other non-sterile location.

Control of the system can be accomplished through a separate user interface device such as, without limitation, push-buttons or other switching devices, a touchpad screen, separate or attached or a part of the 3D display, or a joystick, mouse or similar device controlling the system that provides user feedback on the 3D display screen or on another screen or output indication device. Such user feedback could be stereoscopic to enhance effectiveness.

Communication, including transmittal of image data, and additional control of a system of these embodiments could be performed thru an external interface, including without limitation a network, USB, "firewire" or custom designed port, to other devices or to a network.

FIGS. 9 through 13 illustrate various embodiments of a stereoscopic electronic microscope workstation, along with various components and characteristics thereof.

Figure 9:
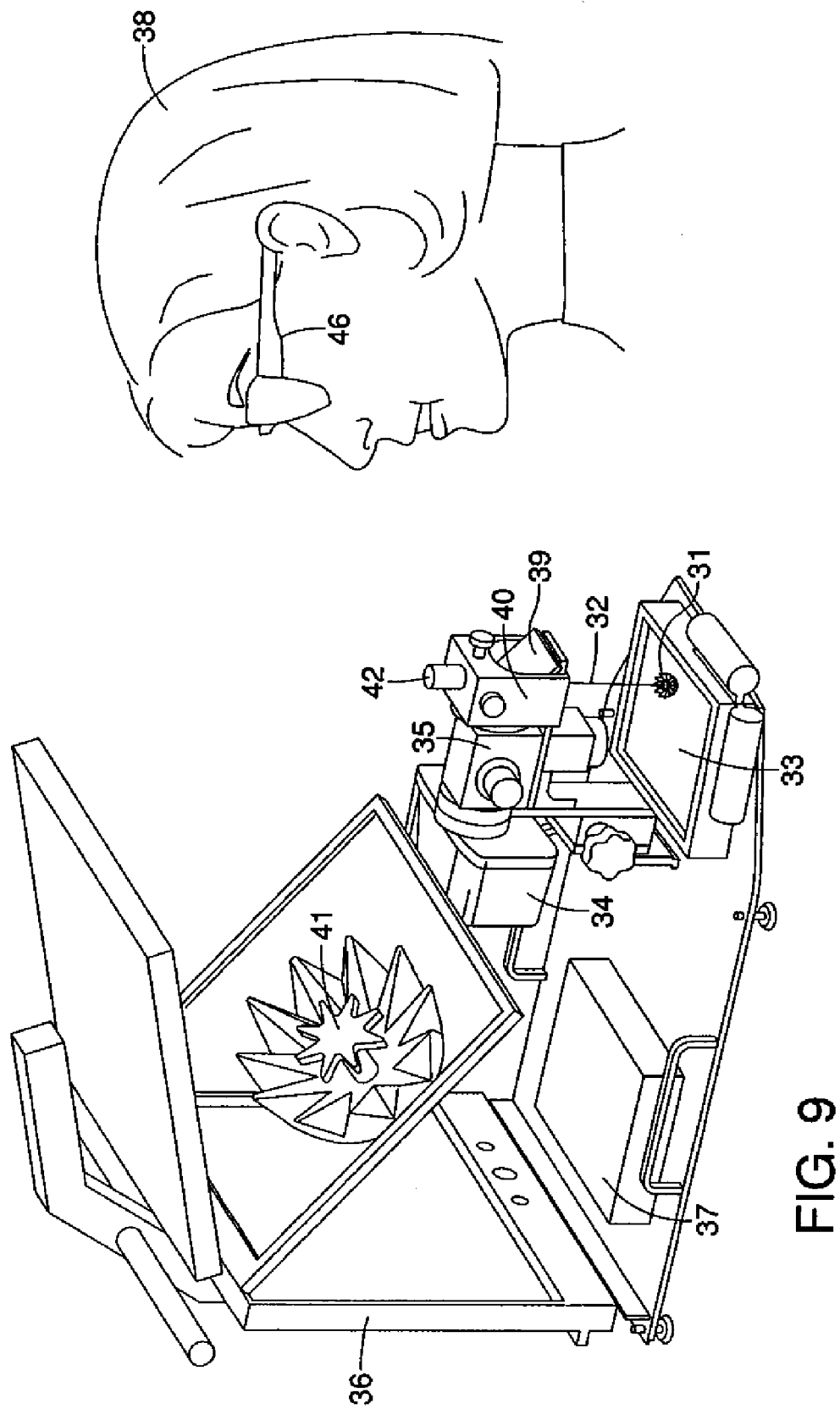
FIG. 9 is a perspective view of an embodiment of the present invention illustrating a desktop stereoscopic imaging workstation utilizing a stereoscopic display means.

Turning to FIG. 9, an object 31 under observation by a user 38 is illustrated within a central optical axis 32. Upon deflection into a main objective lens located inside the stereomicroscope 35 the central axis 32 has a generally horizontal portion in this embodiment. With this embodiment and its single objective lens the central optical axis is rather obvious. In embodiments having no objective lens, multiple objective lenses or multiple optical paths the central optical axis is defined as the general central axis of all pertinent axes or bodies.

As depicted, a holding means 33 can be utilized to stabilize the object 31 under observation, where required. Examples of holding means 33 are an X-Y stage, as illustrated, slides or other physical, chemical or magnetic means to stabilize object 31 in a position and orientation for effective viewing. A stereoscopic image acquisition device 34, a stereomicroscope 35, a stereoscopic display 36 and an image processing unit 37 is also illustrated in the figure.

In the embodiment illustrated in FIG. 9 a beam-splitting style deflective element 39 is utilized. A deflecting element mounting system 40 as illustrated provides a manual mechanism providing 2-axis motion control for the deflecting element 39.

After processing by the stereomicroscope 35, the stereoscopic image acquisition device 34 and the image processing unit 37, a magnified image 41 of object 31 is presented in the display means 36.

It is also desirable in preferred embodiments to equip the stereomicroscope 35 with a laser pointer 42 for positioning and orienting the object 31 on the holding means 33 under the stereomicroscope 35.

It is noted that the image received by the stereomicroscope 35 is a reflection of the object 31. However, the desired magnified image 41 can be configured to be presented in the same orientation as the object 31, such that a user's movement of a tool at the object 31 is shown in a similar direction and orientation at the magnified image 41. Since the acquired image data is electronic, such image data can be reversed or de-reflected by circuitry inside the stereoscopic image acquisition device 34 or the image processing unit 37 (or a display controller, if configured), to provide a desirable, non-reflected magnified image. Alternatively, one or more additional units of a deflecting element 39 can be placed in the optical path, or display means 36, to re-reflect the magnified image 41.

A further embodiment of the invention uses a display means 36 placed at a distance from the user 38 such that when the user 38 focuses on the magnified image 41, the peripheral vision of the user 38, including any reduction of it due to spectacles required for 3D viewing, allows the user 38 to see the object 31, a hand tool or other pertinent object or motion of them without losing focus on the magnified image 41. Alternatively, the user 38 could focus on the object 31 being imaged or tool and still see the magnified image 41 through peripheral vision. Though peripheral acuity is not as good as foveal acuity it can be sufficient to allow the user 38, for example, without limitation, to change a hand tool while not losing focus on the magnified image 41. For example, a medical surgeon performing a procedure utilizing an embodiment of the present invention could change a hand tool from a scalpel to a clamp utilizing peripheral vision without losing focus on the magnified image 41.

Conversely such a system, where the display means 36 is configured in an optimal position, allows the user 38 to focus, for example, on a tool and generally see the magnified image 41 on the display means 36 with peripheral vision such that motion of the object 31 can be seen. These are important improvements to the art, especially in situations where long periods are spent doing meticulous work using a variety of different tools under the stereomicroscope 35, such as in eye surgery. Such a system reduces tool-change time and fatigue of the user 38.

The position of the display means 36 can also be configured to allow for multiple users desiring to observe the magnified image 41. Should additional display means 36 be desired, such as for a remote location, the digital image data can be replicated to additional locations or analog electronic splitting devices can be installed to duplicate electronic signals, (if the display means utilizes an analog signal). The display means 36 shown in FIG. 9 can also include side shields (not shown) that block reflections from ceiling or overhead lights into the eyes of the user 38.

To accommodate the height or personal preference of a user 38, it can be desirable to move the stereoscopic image acquisition device 34 and stereomicroscope 35 closer to or farther from the display means 36, or to tilt them such that the central optical axis 32 is no longer generally horizontal, or to move or tilt the display means 36, to optimize viewing distance and avoid display occlusion. A mechanism to do this could also be attached to the apparatus. Such a mechanism can include the ability to move the deflecting element 39 simultaneously to keep a desired view of the object 31, for example by rotating the stereoscopic image acquisition device 34 and stereomicroscope 35 about the reflection point of the central optical axis 32 while rotating the element by one half of the stereoscopic image acquisition device 34 and stereomicroscope 35 rotation.

In a further embodiment of this invention, the stereomicroscope 35 and stereoscopic image acquisition device 34 are placed above the line of sight of the user 38, as shown in FIG. 10. For simplicity the means to hold the object is not shown in this figure. In this embodiment the deflecting element 39 is not necessarily required to clear the line-of-sight and can be omitted if desired. This embodiment allows the user 38 to see the object 31 and its magnified image 41 with only a small change in viewing angle.

As shown, the user 38 is wearing a pair of polarized spectacles 46 to view the single flat LCD display means 36 with stereoscopic vision. If such spectacles 46 are utilized for stereoscopic viewing, the bottom portion of the lens and frame of a spectacles 46 can optionally be removed (not as illustrated) to allow an unobstructed, generally downward, view of the object 31 while still providing the three dimensional view when looking, generally straight, at the display means.

Figure 11:
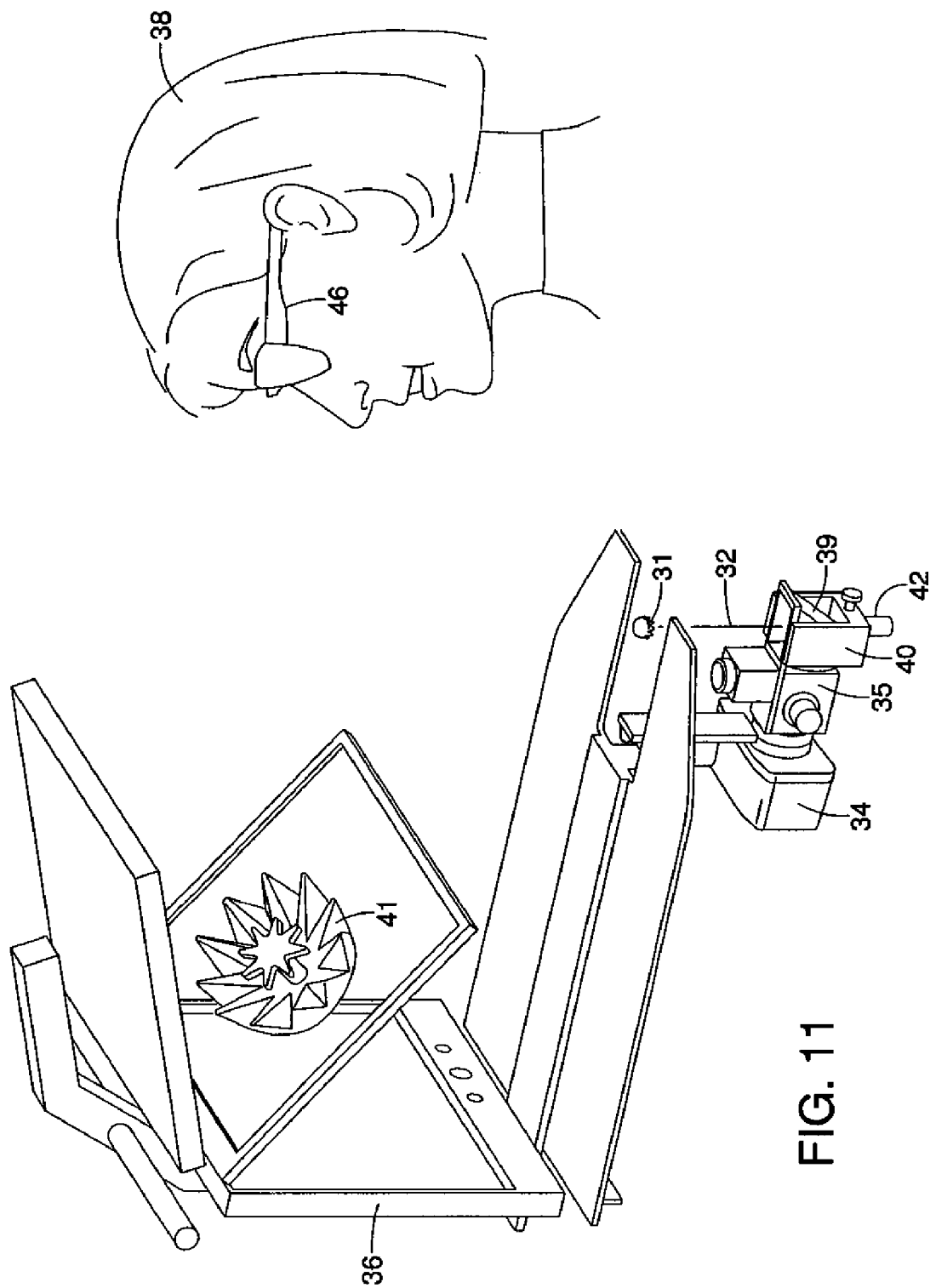
FIG. 11 is a perspective view of an embodiment of the present invention illustrating an inverted stereomicroscope workstation utilizing a stereoscopic display means.

Turning to FIG. 11, a further embodiment of a stereoscopic microscope in a workstation, positions the microscope below the object. Such an orientation of the microscope can also be termed an "inverted microscope" in the art.

A further embodiment, as shown in FIG. 12, positions the display directly in front of and very close to the user 38. This display means could be of the barrier type, where a separate left view 47 and right view 48 are presented side-by-side with a barrier 49 to block the cross-eye view and possibly including optics to present the magnified image 41 to the eye for proper viewing. While not illustrated, a display means similar to that known as the "head mounted display" could also be utilized, whether the display means is mounted to the stereomicroscope 35 or the head of the user 38. The user 38 positions himself or herself to see the magnified image 41 optimally. These embodiments have an effect of reducing the physical dimensions of the workstation considerably.

Alternatively, other types of display means can be used in this workstation and in conjunction with the stereoscopic image acquisition device 34. For example, these could include a fast-switching visual display device that switches between left and right images and includes a switching device such that the user 38 wears differently-polarized spectacles, (not illustrated). Another type of display means is one in which a single flat LCD is used and the left and right images are interleaved horizontally and polarized differently such that the user wears differently-polarized spectacles, (not illustrated).

Figure 14:
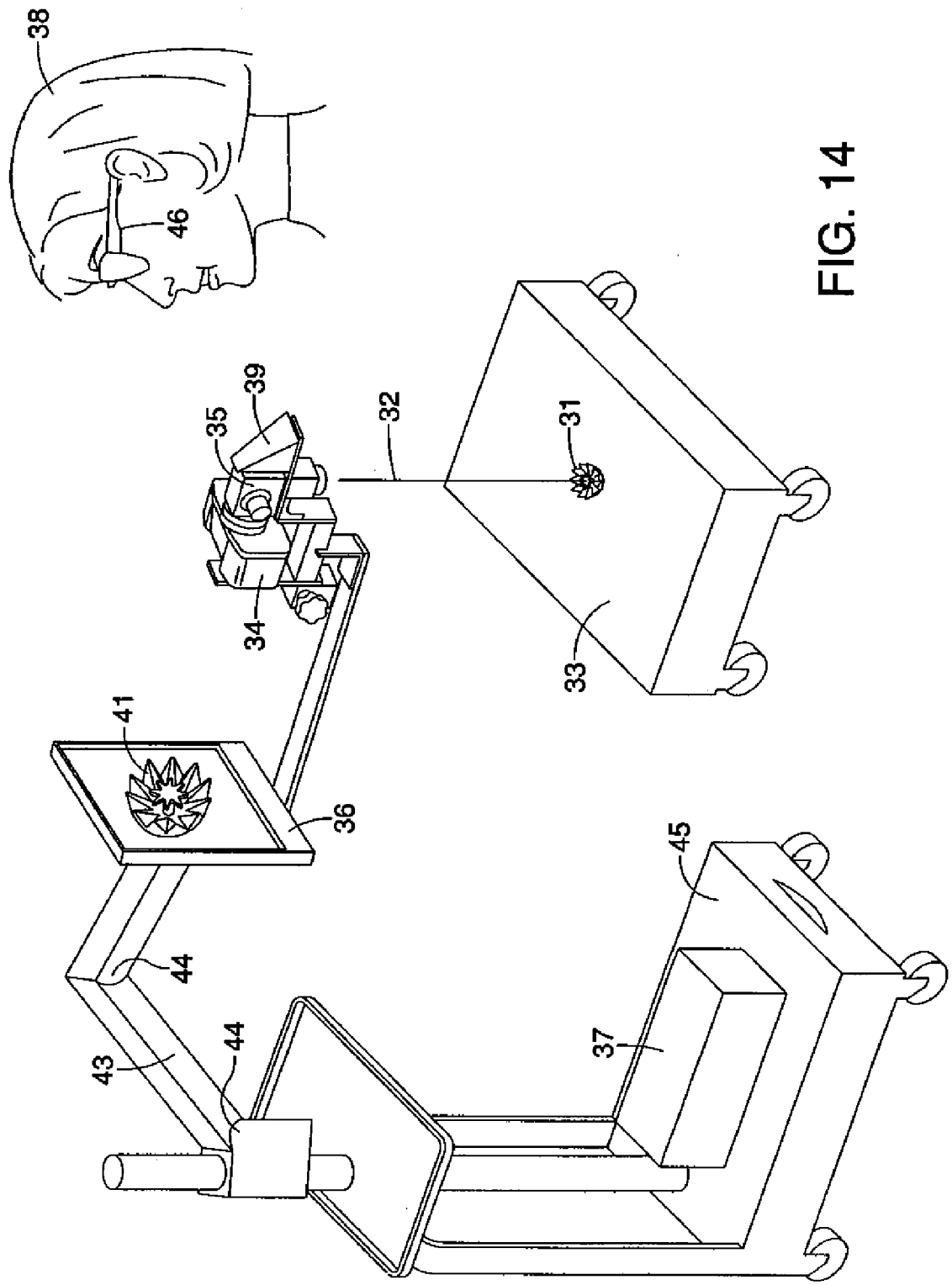
FIG. 14 is a perspective view of an embodiment of the present invention illustrating a free-standing stereoscopic imaging workstation utilizing a single flat LCD display as a stereoscopic display means.

Turning briefly to FIG. 14, a preferred single flat LCD display means 36 is illustrated. While there are a plurality of such display means commercially sold, one such display means is sold under the trademark "PolarScreen." In this embodiment, two flat liquid crystal display (LCD) panels are stacked one on top of each other to form a single flat LCD display, wherein the first LCD panel controls total pixel intensity and the second LCD panel controls left-eye/right-eye distribution ratio. In such an embodiment, a user 38 typically wears differently-polarized spectacles 46. The readily observable benefit of such an embodiment is that it provides a stereoscopic display means 36 as a single flat LCD display without the clutter of multiple screens shown in other embodiments illustrated herein.

Speaking generally to embodiments illustrated in FIGS. 9 through 13, along with other embodiments contemplated by the present disclosure, additional deflecting elements can be used, both in series and in parallel with respect to the central optical axis or optical axes parallel to it. The following configurations can apply to one or more deflecting elements configured in an embodiment of the present invention.

A deflective element can be mounted such that it can be rotated about one or more axes to provide a change in the location of the viewing point of the object being viewed. This aspect provides a "panning" action, useful in viewing a moving object. Such a feature also provides an easy way to change the view on a heavy or difficult-to-move object.

A mounting can be controlled manually with a mechanism by the user or with a motorized system and joystick or similar I/O device. Additionally a computer can cause the motion to follow a pre-programmed path or a vision-recognition system could cause it to track a moving object. Such a mounting system can also be configured to control multiple deflecting elements to move differently from each other or the same as each other.

Optionally, the position and motion of such a mounting system could be quantified and the relative distance and speed of points-of-interest on the object could then be extrapolated to provide measurement capability.

A deflective element could be mounted to allow motion, with respect to the rest of the device, generally horizontally along the central optical axis (i.e. to/from the user) to change vertical working distance into horizontal and vice-versa.

Alternatively, a deflective element could be fixed with respect to the object, and the stereomicroscope and stereoscopic image acquisition device portion of the apparatus could be moved generally horizontally along the central optical axis (i.e. to/from the element) to provide a means to adjust the focus of the object's image on the sensors' focal planes. In such an embodiment the deflective element can have an adjustable mounting system to precisely align the optical axis to the focus axis such that the view does not move transversely when the focus is changed.

In yet other applications, the stereoscopic image acquisition device and stereomicroscope components, (with or without the deflecting element), can be rotated such that a view of the object from a desired direction is obtained, and the central optical axis may or may not be generally vertical. The displayed image can be oriented as desired by the user by electronically modifying the image data in the image processing unit, or possibly by rotating the display means.

A deflective element can also be mounted to allow quick replacement with other deflective elements having different optical or other properties. Quick replacement can also be useful for quick cleaning or maintenance of the deflective element.

It is also contemplated that deflective elements mounted at different angles to the central optical axis could be used to provide optimal angles of the axis for different applications. The mounting angle could be adjusted in the mount and then fixed at an optimal angle. Additionally, the body of the device including the stereomicroscope and stereoscopic image acquisition device can be configured such that the central optical axis, after deflection by the deflecting element, is not horizontal.

A deflecting element can have optical properties known as a "cold mirror" that reflects visible light but transmits infrared light. Alternatively, it can likewise have properties known as a "hot mirror" that reflects infrared light but transmits visible light.

A deflective element can have optical properties that transmit a range of wavelengths and reflect other wavelengths as desired. Such a deflective element can be useful, for example, for fluorescence imaging where an object is illuminated with one wavelength, causing it to fluoresce, and viewed in other wavelengths which show fluorescing of the object. The deflecting element could pass the illumination beam but reflect, into the microscope, the reflected light of the fluorescing wavelength.

A deflective element could be planar or non-planar.

A deflective elements shape could be a portion of circular cylinder, spherical, parabolic, ellipsoidal or of another non-planar shape such that the element can focus an image on the sensors of the stereoscopic image acquisition device without the use of refractive optics. Such a deflective element could be useful, for example, for imaging in infrared wavelengths.

A deflective element can be configured as a beam-splitter, and can deflect a portion of the light to a different axis. An illuminator can be placed above or near the deflective element causing generally collimated light to illuminate the object in an axis generally coaxial with the central optical axis. This configuration allows the illuminator to be truly coaxial and to be generally easily adjusted for alignment.

A deflective element can deflect a portion of the light. A laser pointer or similar device can be placed above the deflective element causing a generally downward vertical beam of laser light to be generally coaxial with the central optical axis, illuminating a spot on the object such that the area being imaged can be observed or its reaction to laser light can be observed. Such a configuration allows quick placement of an object such that a desired viewing area of an object can be properly positioned. Alternatively, the pointing device could be made to illuminate along the horizontal portion of the central optical axis and the deflecting element could then deflect its beam in a similar manner to designate the area on the object.

A device known in the art as a stage 33 can be utilized to hold the object being imaged, as shown in FIGS. 9 and 12. Motion and position of the stage's platen could be quantified and the relative distance and speed of points-of-interest on the object could then be extrapolated to provide measurement capability.

In an alternative embodiment the deflecting element could be placed between the main objective lens of the stereomicroscope and the zooming or imaging optics such that the central optical axis is again deflected from being generally vertical to being generally horizontal, with the axis of the main objective being generally vertical.

Figure 13:
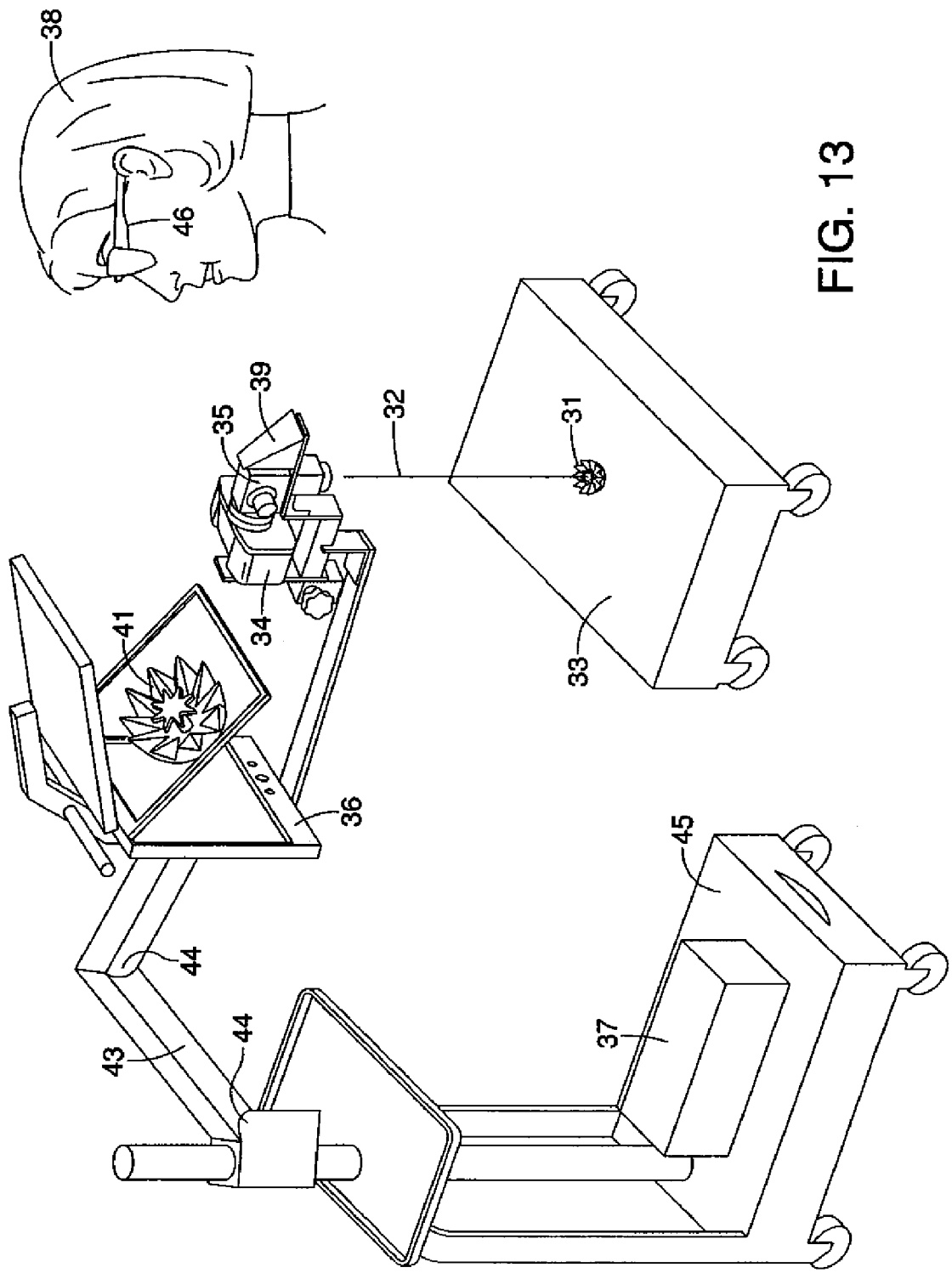
FIG. 13 is a perspective view of an embodiment of the present invention illustrating a free-standing stereoscopic imaging workstation utilizing a stereoscopic display means.

Turning to FIGS. 13 and 14, a stereoscopic microscope workstation in a free-standing configuration is illustrated. As depicted, it can be useful to mount a stereoscopic microscope workstation on an articulating arm 43, possibly with a device to counterbalance the weight and lock/unlock the arm's joints 44. The stereomicroscope 35 and display means can be easily positioned in the appropriate location for the task at hand. For example, without limitation, a wheeled pedestal 45 with the articulating arm 43 and joints 44 can be easily maneuvered and the central optical axis 2 properly positioned such that a user 38 could use this workstation to perform surgery on a patient located on a holding means 33. The central optical axis 32 need not be generally vertical in such embodiments. Rather the central optical axis 32 could be oriented in any desired direction to obtain the desired view of the object, (e.g. the side of the patient on a horizontal axis).

In other embodiments, the wheeled pedestal 45 can be part of an existing device, as in for example a surgical microscope, and the other components of this invention could be attached by means of retrofit to it. The workstation can also be mounted from the ceiling or from an overhead gantry rather than the wheeled pedestal 45 illustrated. Alternatively, such an overhead gantry, or an additional gantry, can be mounted between the display means 36 and stereoscopic image acquisition device and stereomicroscope components to move them with respect to each other.

VI. CONCLUSION

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, the device could be adapted slightly for use in other type of optical viewing systems including, without limitation, binoculars and endoscopes.

Unless otherwise indicated, all numbers expressing quantities of ingredients, properties such as molecular weight, reaction conditions, and so forth used in the specification and claims are to be understood as being modified in all instances by the term "about" or "approximately." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value failing within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. It is anticipated that one or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications, if any, are herein individually incorporated by reference in their entirety.

In closing, it is to be understood that the embodiments of the invention disclosed herein are illustrative of the principles of the present invention. Other modifications that can be employed are within the scope of the invention. Thus, by way of example, but not of limitation, alternative configurations of the present invention can be utilized in accordance with the teachings herein. Accordingly, the present invention is not limited to that precisely as shown and described.

What is claimed is:

1. A stereoscopic microscope workstation for a user to view an object as a magnified image, comprising:
    a stereomicroscope configured to:
        (a) acquire a plurality of optical views of the object; and
        (b) provide a plurality of optical paths of the plurality of optical views;
    a stereoscopic image acquisition device configured to:
        (a) acquire the plurality of optical paths from the stereomicroscope; and
        (b) transmit a real-time image data stream representing the plurality of optical paths;
    a display device configured to:
        (a) receive the real-time image data stream; and
        (b) display a stereoscopic magnified image of the object to the user; and
    a deflecting element disposed between the object and the stereomicroscope, the deflecting element providing a change in a location of a viewing point of the object by rotating about an axis.

2. The stereoscopic microscope workstation of claim 1, wherein the real-time image data stream has a resolution of at least 1280×720 pixels for at least two of the optical views of the plurality of optical views.

3. The stereoscopic microscope workstation of claim 1, wherein the magnified image of the object is displayed in the same orientation as the object.

4. The stereoscopic microscope workstation of claim 1, which includes an image processing unit configured to manipulate the real-time image data stream prior to the display device receiving the real-time image data stream, the image processing unit being separate from the stereoscopic image acquisition device.

5. The stereoscopic microscope workstation of claim 4, wherein the image processing unit for manipulating the real-time image data stream is configured to rotate, crop, invert, mirror and filter the real-time image data stream.

6. The stereoscopic microscope workstation of claim 4, wherein the image processing unit for manipulating the real-time image data stream is affixed to the stereoscopic microscope workstation.

7. The stereoscopic microscope workstation of claim 1, wherein the display device comprises a single flat LCD display device, such that the user wears differently-polarized spectacles to achieve a stereoscopic view of the object in the magnified image.

8. The stereoscopic microscope workstation of claim 1, wherein the display device comprises separate left and right views.

9. The stereoscopic microscope workstation of claim 1, wherein the stereoscopic microscope workstation is configured in a free-standing configuration.

10. The stereoscopic microscope workstation of claim 1, wherein:
 (a) the stereomicroscope is disposed above a line of sight of the user; and
 (b) the stereoscopic image acquisition device is disposed above the line of sight of the user.

11. The stereoscopic microscope workstation of claim 1, wherein the deflective element is configured to change a central optical axis of the plurality of optical paths.

12. The stereoscopic microscope workstation of claim 1, which includes spectacles, at least a portion of the spectacles being polarized, thereby providing a stereoscopic view of the magnified image of the object.

13. The stereoscopic microscope workstation of claim 1, which includes a holder configured to hold the object, thereby controlling the position and motion of the optical views of the object.

14. The stereoscopic microscope workstation of claim 13, wherein the holder includes a stage configured to quantify the relative distance of points-of-interest on the object to provide measurement capabilities.

15. The stereoscopic microscope workstation of claim 1, which includes a mounting system configured to control the position and motion of the optical views of the object.

16. The stereoscopic microscope workstation of claim 15, wherein the mounting system is configured to quantify the relative distance of points-of-interest on the object to provide measurement capabilities.

17. A stereoscopic microscope workstation for a user to view an object as a magnified image, comprising:
 a stereomicroscope configured to:
  (a) acquire a plurality of optical views of the object; and
  (b) provide a plurality of optical paths of the plurality of optical views;
 a stereoscopic image acquisition device configured to:
  (a) acquire the plurality of optical paths from the stereomicroscope; and
  (b) transmit a high-resolution real-time image data stream representing the plurality of optical paths, the high-resolution real-time image data stream having a resolution of at least 1280×720 for at least two of the optical views in the plurality of optical views;
 an image processing unit configured to manipulate the real-time image data;
 a display device configured to:
  (a) receive the high-resolution real-time image data stream; and
  (b) display a stereoscopic magnified image of the object to the user; the stereoscopic magnified image of the object being presented in the same orientation as the object; and
 a deflecting element disposed between the object and the stereomicroscope, the deflecting element providing a change in a location of a viewing point of the object by rotating about an axis.

18. The stereoscopic microscope workstation of claim 17, which includes spectacles, a portion of the spectacles being polarized, the display device including a single flat LCD display device providing stereoscopic views of the magnified image of the object.

19. The stereoscopic microscope workstation of claim 17, wherein the stereoscopic microscope workstation is configured in a free-standing configuration.

\* \* \* \* \*